United States Patent
Guo et al.

(10) Patent No.: US 10,540,554 B2
(45) Date of Patent: Jan. 21, 2020

(54) REAL-TIME DETECTION OF TRAFFIC SITUATION

(71) Applicant: TOYOTA JIDOSHA KABUSHIKI KAISHA, Toyota-shi, Aichi-ken (JP)

(72) Inventors: Rui Guo, Mountain View, CA (US); Kentaro Oguchi, Menlo Park, CA (US)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 62 days.

(21) Appl. No.: 15/939,308

(22) Filed: Mar. 29, 2018

(65) Prior Publication Data
US 2019/0303686 A1    Oct. 3, 2019

(51) Int. Cl.
  G06K 9/00    (2006.01)
  G06K 9/32    (2006.01)
  G06T 7/70    (2017.01)
  G06K 9/62    (2006.01)

(52) U.S. Cl.
  CPC ....... G06K 9/00785 (2013.01); G06K 9/3241 (2013.01); G06K 9/6201 (2013.01); G06T 7/70 (2017.01); *G06T 2210/12* (2013.01)

(58) Field of Classification Search
  CPC combination set(s) only.
  See application file for complete search history.

(56) References Cited

U.S. PATENT DOCUMENTS

| 9,195,914 | B2 | 11/2015 | Fairfield et al. | |
| 9,221,461 | B2 | 12/2015 | Ferguson et al. | |
| 9,424,475 | B1 | 8/2016 | Lo et al. | |
| 2010/0104199 | A1* | 4/2010 | Zhang | G06K 9/00798 382/199 |
| 2011/0255740 | A1* | 10/2011 | Wu | G06K 9/00785 382/103 |

(Continued)

FOREIGN PATENT DOCUMENTS

JP    2006350571 A    12/2006

OTHER PUBLICATIONS

Ji et al., "Video-based construction vehicles detection and its application in intelligent monitoring system," CAAI Transactions on Intelligence Technology, 2016 (11 pages).

(Continued)

*Primary Examiner* — Alex Kok S Liew
(74) *Attorney, Agent, or Firm* — Patent Law Works LLP

(57) ABSTRACT

A method extracts a region of interest (ROI) from an image depicting a roadway; executes a first object detector that detects, in the ROI, a first situation object matching a first object type; generates a first object confidence score for the first situation object; executes, in parallel with the first object detector, a second object detector that detects, in the ROI, a second situation object matching a second object type different from the first object type; generates a second object confidence score for the second situation object; determines that the first object type and the second object type are associated with a prospective situation category; combines the first object confidence score and the second object confidence score into a situation confidence score corresponding to the prospective situation category; evaluates the situation confidence score to determine that a traffic situation defined by the prospective situation category is depicted in the ROI.

19 Claims, 5 Drawing Sheets

(56) References Cited

U.S. PATENT DOCUMENTS

| | | | | |
|---|---|---|---|---|
| 2012/0072080 A1* | 3/2012 | Jeromin | ............... | B60Q 1/143 |
| | | | | 701/49 |
| 2014/0063232 A1* | 3/2014 | Fairfield | ............... | G06K 9/78 |
| | | | | 348/118 |
| 2015/0367781 A1* | 12/2015 | Takemae | ............... | B60R 1/00 |
| | | | | 348/148 |
| 2016/0210530 A1 | 7/2016 | Li et al. | | |

OTHER PUBLICATIONS

Fisher, "3×4 Projection Matrix," Apr. 16, 1997, retrieved from https://support.pix4d.com/hc/en-us/articles/202559089-How-are-the-Internal-and-External-Camera-Parameters-defined-#gsc.tab=0, 3 pgs.

Girshick, "Deformable part models," Guest Lecture Apr. 16, 2013, Stanford University, 68 pgs.

Girshick et al., "Rich Feature Hierarchies for Accurate Object Detection and Semantic Segmentation," Department of Computer Science, University of Illinois at Urbana-Champaign, 32 pgs.

PIX4D, "How are the Internal and External Camera Parameters defined?" at least as early as Dec. 11, 2017, retrieved from http://homepages.inf.ed.ac.uk/rbf/CVonline/LOCAL_COPIES/EPSRC_SSAZ/node3.html, 3 pgs.

* cited by examiner

REAL-TIME DETECTION OF TRAFFIC SITUATION

BACKGROUND

The present disclosure relates to detecting traffic situation. In a more particular example, the disclosure relates to technologies for detecting traffic situations depicted in road scene images using image processing.

Adaptive path planning often requires detection of traffic situations. However, it is challenging to detect and analyze the traffic situations in real-time as the vehicles travel along the roads. Today, some modern vehicles rely on the images they capture to detect the traffic situations in their surrounding environments. However, these vehicles are generally incapable of detecting and analyzing complicated traffic situations with multiple objects, or to the extent they can detect and analyze these traffic situations, such detection and analysis are often incomplete and inaccurate due to the limitations of the image processing performed on the images. Otherwise, the existing techniques are generally impractical or impossible to be performed in real-time due to the massive amount of required computation.

SUMMARY

The subject matter described in this disclosure overcomes the deficiencies and limitations of the existing solutions by providing novel technology for detecting traffic situations depicted in road scene images.

According to one innovative aspect of the subject matter described in this disclosure, a computer-implemented method comprises: extracting a region of interest (ROI) from an image depicting a roadway; executing a first object detector that detects, in the ROI, a first situation object matching a first object type based on object features of the first situation object, the first situation object reflecting a first physical roadway object depicted in the ROI; generating a first object confidence score for the first situation object based on a level of similarity between the first situation object and the first object type; executing, in parallel with the first object detector, a second object detector that detects, in the ROI, a second situation object matching a second object type that is different from the first object type based on object features of the second situation object, the second situation object reflecting a second physical roadway object depicted in the ROI; generating a second object confidence score for the second situation object based on a level of similarity between the second situation object and the second object type; determining that the first object type detected by the first object detector and the second object type detected by the second object detector are associated with a first prospective situation category; combining the first object confidence score and the second object confidence score into a first situation confidence score corresponding to the first prospective situation category; and evaluating the first situation confidence score to determine that the first prospective situation category applies to the ROI and that a first traffic situation defined by the first prospective situation category is depicted in the ROI.

In general, another innovative aspect of the subject matter described in this disclosure may be embodied in computer-implemented methods comprising: extracting a first region of interest (ROI) from a first image depicting a roadway; executing, in parallel, a first object detector that detects a first situation object matching a first object type in the first ROI and a second object detector that detects a second situation object matching a second object type in the first ROI, the first object type being different from the second object type; generating a first object confidence score for the first situation object and a second object confidence score for the second situation object; determining that the first object type detected by the first object detector and the second object type detected by the second object detector are associated with a first prospective situation category; combining the first object confidence score and the second object confidence score into a first situation confidence score corresponding to the first prospective situation category; evaluating the first situation confidence score to determine that the first prospective situation category does not apply to the first ROI of the first image and that a first traffic situation defined by the first prospective situation category is not depicted in the first ROI of the first image; extracting a second ROI from a second image depicting the roadway; executing, in parallel, the first object detector that detects a third situation object matching the first object type in the second ROI and the second object detector that detects a fourth situation object matching the second object type in the second ROI; generating a third object confidence score for the third situation object and a fourth object confidence score for the fourth situation object; combining the third object confidence score and the fourth object confidence score into a second situation confidence score corresponding to the first prospective situation category; and evaluating the second situation confidence score to determine that the first prospective situation category applies to the second ROI of the second image and that the first traffic situation defined by the first prospective situation category is depicted in the second ROI of the second image.

In general, another innovative aspect of the subject matter described in this disclosure may be embodied in systems comprising: one or more processors; one or more memories storing instructions that, when executed by the one or more processors, cause the system to: extract a region of interest (ROI) from an image depicting a roadway; execute a first object detector that detects, in the ROI, a first situation object matching a first object type based on object features of the first situation object, the first situation object reflecting a first physical roadway object depicted in the ROI; generate a first object confidence score for the first situation object based on a level of similarity between the first situation object and the first object type; execute, in parallel with the first object detector, a second object detector that detects, in the ROI, a second situation object matching a second object type that is different from the first object type based on object features of the second situation object, the second situation object reflecting a second physical roadway object depicted in the ROI; generate a second object confidence score for the second situation object based on a level of similarity between the second situation object and the second object type; determine that the first object type detected by the first object detector and the second object type detected by the second object detector are associated with a first prospective situation category; combine the first object confidence score and the second object confidence score into a first situation confidence score corresponding to the first prospective situation category; and evaluate the first situation confidence score to determine that the first prospective situation category applies to the ROI and that a first traffic situation defined by the first prospective situation category is depicted in the ROI.

These and other implementations may each optionally include one or more of the following features: that determining a first bounding box indicating the first situation object in the ROI, determining a second bounding box indicating the second situation object in the ROI, and aggregating the first bounding box indicating the first situation object and the second bounding box indicating the second situation object to generate a situation region of the first traffic situation depicted in the ROI; that extracting the ROI from the image includes extracting, from the image, the ROI associated with a prominent color; that the first prospective situation category is associated with a first set of object types in a data store, the first set of object types including the first object type detected by the first object detector and the second object type detected by the second object detector, and a second prospective situation category is associated with a second set of object types in the data store, the second set of object types including a third object type detected by a third object detector and a fourth object type detected by a fourth object detector, the third object type being different from the fourth object type; that executing, in parallel with the first object detector, a third object detector that detects, in the ROI, a third situation object matching a third object type based on object features of the third situation object, the third situation object reflecting a third physical roadway object depicted in the ROI, generating a third object confidence score for the third situation object based on a level of similarity between the third situation object and the third object type, executing, in parallel with the first object detector, a fourth object detector that detects, in the ROI, a fourth situation object matching a fourth object type based on object features of the fourth situation object, the fourth situation object reflecting a fourth physical roadway object depicted in the ROI, generating a fourth object confidence score for the fourth situation object based on a level of similarity between the fourth situation object and the fourth object type, determining that the third object type detected by the third object detector and the fourth object type detected by the fourth object detector are associated with a second prospective situation category, combining the third object confidence score and the fourth object confidence score into a second situation confidence score corresponding to the second prospective situation category, and evaluating the first situation confidence score and the second situation confidence score to determine that the first prospective situation category applies to the ROI, the second prospective situation category applies to the ROI, and that the first traffic situation defined by the first prospective situation category and a second traffic situation defined by the second prospective situation category are depicted in the ROI; that executing, in parallel with the first object detector, a third object detector that detects, in the ROI, a third situation object matching a third object type based on object features of the third situation object, the third situation object reflecting a third physical roadway object depicted in the ROI, generating a third object confidence score for the third situation object based on a level of similarity between the third situation object and the third object type, executing, in parallel with the first object detector, a fourth object detector that detects, in the ROI, a fourth situation object matching a fourth object type based on object features of the fourth situation object, the fourth situation object reflecting a fourth physical roadway object depicted in the ROI, generating a fourth object confidence score for the fourth situation object based on a level of similarity between the fourth situation object and the fourth object type, determining that the third object type detected by the third object detector and the fourth object type detected by the fourth object detector are associated with a second prospective situation category, combining the third object confidence score and the fourth object confidence score into a second situation confidence score corresponding to the second prospective situation category, and evaluating the first situation confidence score and the second situation confidence score to determine that the first prospective situation category applies to the ROI, the second prospective situation category does not apply to the ROI, and that the first traffic situation defined by the first prospective situation category is depicted in the ROI; that executing, in parallel with the first object detector, a third object detector that detects, in the ROI, a third situation object matching a third object type based on object features of the third situation object, the third situation object reflecting a third physical roadway object depicted in the ROI, generating a third object confidence score for the third situation object based on a level of similarity between the third situation object and the third object type, determining that the first object type detected by the first object detector and the third object type detected by the third object detector are associated with a second prospective situation category, combining the first object confidence score and the third object confidence score into a second situation confidence score corresponding to the second prospective situation category, and evaluating the first situation confidence score and the second situation confidence score to determine that the first prospective situation category applies to the ROI, the second prospective situation category does not apply to the ROI, and that the first traffic situation defined by the first prospective situation category is depicted in the ROI; that combining the first object confidence score and the second object confidence score into the first situation confidence score corresponding to the first prospective situation category includes retrieving a first situation detection weight of the first object type in detecting traffic situations defined by the first prospective situation category, retrieving a second situation detection weight of the second object type in detecting traffic situations defined by the first prospective situation category, and computing the first situation confidence score based on the first object confidence score of the first situation object, the first situation detection weight of the first object type, the second object confidence score of the second situation object, and the second situation detection weight of the second object type; that determining that a second traffic situation defined by the first prospective situation category is depicted in a training image, and adjusting one or more of the first situation detection weight of the first object type in detecting traffic situations defined by the first prospective situation category and the second situation detection weight of the second object type in detecting traffic situations defined by the first prospective situation category based on a comparison of the second traffic situation detected in the training image to a predetermined target output associated with the training image.

Other implementations of one or more of these and other aspects include corresponding systems, apparatus, and computer programs, configured to perform the actions of methods, encoded on non-transitory computer storage devices.

The novel technology for detecting traffic situations presented in this disclosure is particularly advantageous in a number of respects. For example, the technology described herein is capable of detecting various situation objects in a road scene image, and evaluating the detection of multiple situation objects to determine whether the road scene image depicts a traffic situation defined by a particular situation category. Therefore, the accuracy in detecting and categorizing complicated traffic situations can be improved. As a further example, the present technology can prioritize the detection of object portions in detecting situation objects, and detect situation objects of multiple object types in parallel. As a result, the technology described herein can significantly reduce the amount of processing time, and thus, is advantageously applicable to real-time implementations for detecting and categorizing traffic situations.

It should be understood that the foregoing advantages are provided by way of example and that the technology may have numerous other advantages and benefits.

The disclosure is illustrated by way of example, and not by way of limitation in the figures of the accompanying drawings in which like reference numerals are used to refer to similar elements.

DESCRIPTION

The technology described herein can accurately and efficiently detect traffic situations depicted in road scene images. As described in further detail below, the technology includes methods and corresponding systems that can extract a region of interest (ROI) from a road scene image, detect situation objects of various object types in the ROI, and evaluate the detection of the situation objects to determine whether the ROI depicts a traffic situation defined by a particular situation category. If the ROI of the road scene image depicts a traffic situation defined by a particular situation category, the road scene image may be used for localizing the traffic situation to perform adaptive path planning.

Figure 1:
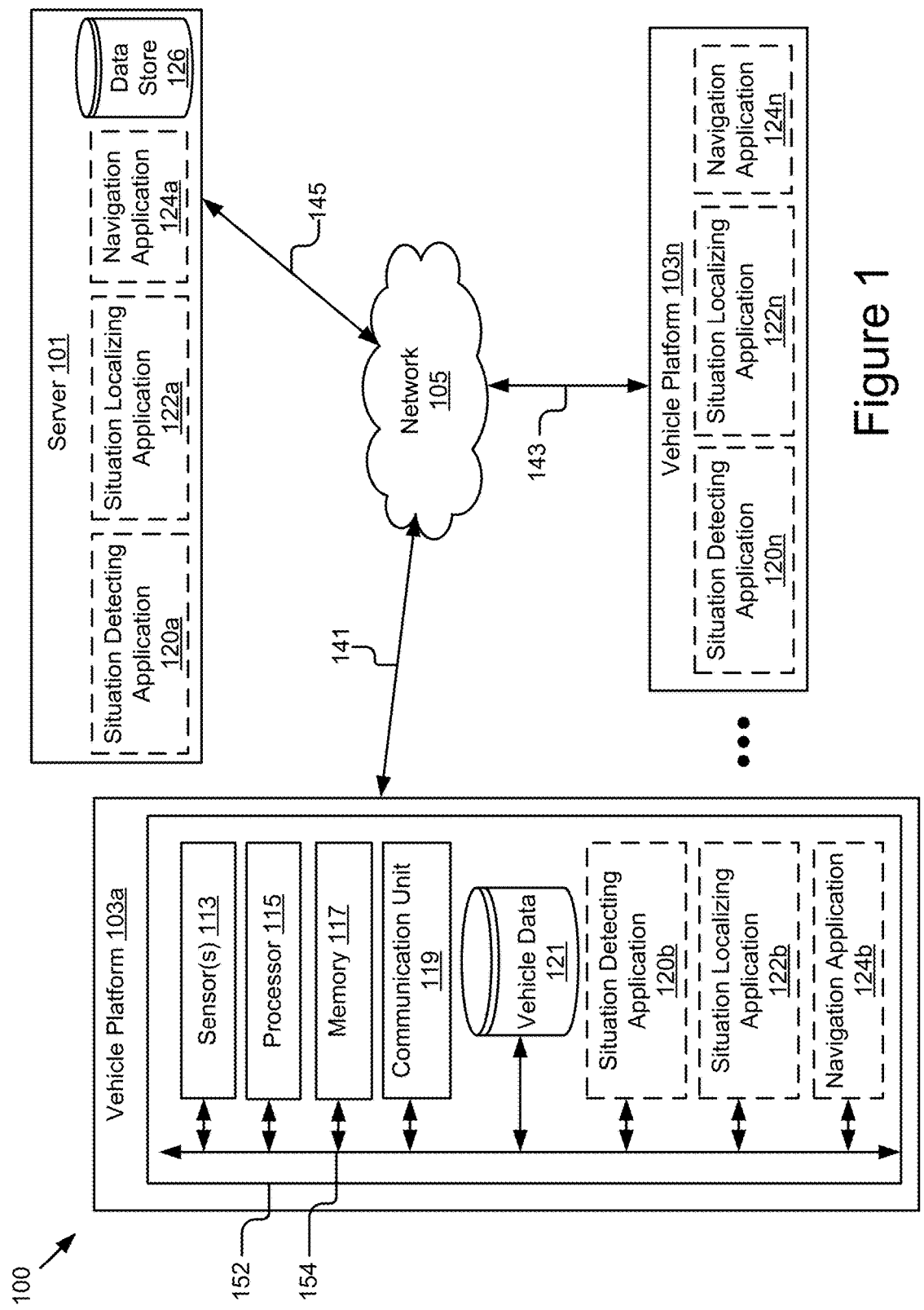
FIG. 1 is a block diagram of an example system for detecting traffic situations.

FIG. 1 is a block diagram of an example system 100 for detecting traffic situations depicted in road scene images. As shown, the system 100 includes a server 101 and one or more vehicle platforms 103a . . . 103n coupled for electronic communication via a network 105. In FIG. 1 and the remaining figures, a letter after a reference number, e.g., "103a," represents a reference to the element having that particular reference number. A reference number in the text without a following letter, e.g., "103," represents a general reference to instances of the element bearing that reference number. It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of vehicle platforms 103, networks 105, or servers 101.

The network 105 may be a conventional type, wired and/or wireless, and may have numerous different configurations including a star configuration, token ring configuration, or other configurations. For example, the network 105 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), vehicular networks, and/or other interconnected data paths across which multiple devices may communicate.

The network 105 may also be coupled to or include portions of a telecommunications network for sending data in a variety of different communication protocols. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other suitable protocols. In some embodiments, the network 105 is a wireless network using a connection such as DSRC (Dedicated Short Range Communication), WAVE, 802.11p, a 3G, 4G, 5G+ network, WiFi™, satellite networks, vehicle-to-vehicle (V2V) networks, vehicle-to-infrastructure/infrastructure-to-vehicle (V2I/I2V) networks, or any other wireless networks. Although FIG. 1 illustrates a single block for the network 105 that couples to the server 101 and the vehicle platform(s) 103, it should be understood that the network 105 may in practice comprise any number of combination of networks, as noted above.

The vehicle platform(s) 103 include computing device(s) 152 having sensor(s) 113, processor(s) 115, memory(ies) 117, communication unit(s) 119, a vehicle data store 121, a situation detecting application 120, a situation localizing application 122, and a navigation application 124. Examples of computing device(s) 152 may include virtual or physical computer processors, control units, micro-controllers, etc., which are coupled to other components of the vehicle platform(s) 103, such as one or more sensors 113, actuators, motivators, etc. The vehicle platform(s) 103 may be coupled to the network 105 via signal line 141, and may send and receive data to and from other vehicle platform(s) 103 and/or the server(s) 101. In some embodiments, the vehicle platform(s) 103 are capable of transporting from one point to another. Non-limiting examples of the vehicle platform(s) 103 include a vehicle, an automobile, a bus, a boat, a plane, a bionic implant, a robot, or any other platforms with non-transitory computer electronics (e.g., a processor, a memory or any combination of non-transitory computer electronics). The vehicle platform(s) 103 may be referred to herein as vehicle(s).

The processor(s) 115 may execute software instructions (e.g., tasks) by performing various input/output, logical, and/or mathematical operations. The processor(s) 115 may have various computing architectures to process data signals. The processor(s) 115 may be physical and/or virtual, and may include a single core or plurality of processing units and/or cores. In the context of the responsive platform 103, the processor may be an electronic control unit (ECU) implemented in the responsive platform 103 such as a car, although other types of platform are also possible and contemplated. The ECUs may receive and store the sensor data as vehicle operation data in the vehicle data store 121 for access and/or retrieval by the situation detecting application 120. In some implementations, the processor(s) 115 may be capable of generating and providing electronic display signals to input/output device(s), supporting the display of images, capturing and transmitting images, performing complex tasks including various types of object recognition and situation detection, etc. In some implementations, the processor(s) 115 may be coupled to the memory(ies) 117 via the bus 154 to access data and instructions therefrom and store data therein. The bus 154 may couple the processor(s) 115 to the other components of the responsive platform(s) 103 including, for example, the sensor(s) 113, the memory(ies) 117, the communication unit(s) 119, and/or and the vehicle data store 121.

The situation detecting application 120 is computer logic executable to detect traffic situations depicted in road scene images. As illustrated in FIG. 1, the server 101 and the vehicle platform 103a . . . 103n may include instances 120a and 120b 120n of the situation detecting application 120. In some embodiments, each instance 120a and 120b 120n may comprise one or more components the situation detecting application 120 depicted in FIG. 2, and may be configured to fully or partially perform the functionalities described herein depending on where the instance resides. In some embodiments, the situation detecting application 120 may be implemented using software executable by one or more processors of one or more computer devices, using hardware, such as but not limited to a field-programmable gate array (FPGA), an application-specific integrated circuit (ASIC), etc., and/or a combination of hardware and software, etc. The situation detecting application 120 may receive and process the sensor data and/or the vehicle data, and communicate with other elements of the vehicle platform 103 via the bus 154, such as the memory 117, the communication unit 119, the vehicle data store 121, etc. The situation detecting application 120 is described in details below with reference to at least FIGS. 2-6.

The situation localizing application 122 is computer logic executable to localize the traffic situation. As illustrated in FIG. 1, the server 101 and the vehicle platform 103a . . . 103n may include instances 122a and 122b . . . 122n of the situation localizing application 122. In some embodiments, the situation localizing application 122 may be implemented using software executable by one or more processors of one or more computer devices, using hardware, such as but not limited to a field-programmable gate array (FPGA), an application-specific integrated circuit (ASIC), etc., and/or a combination of hardware and software, etc. In some embodiments, the situation localizing application 122 may compute the geolocation coordinates of the situation objects present in the traffic situation using the road scene images that the situation detecting application 120 determines as depicting the traffic situation. In some embodiments, the situation localizing application 122 may determine the coverage area of the traffic situation on the geographical map based on the geolocation coordinates of the situation objects, and provide the coverage area of the traffic situation on the geographical map to the navigation application 124.

The navigation application 124 is computer logic executable to provide navigational guidance to users. As illustrated in FIG. 1, the server 101 and the vehicle platform 103a . . . 103n may include instances 124a and 124b . . . 124n of the navigation application 124. In some embodiments, the navigation application 124 may be implemented using software executable by one or more processors of one or more computer devices, using hardware, such as but not limited to a field-programmable gate array (FPGA), an application-specific integrated circuit (ASIC), etc., and/or a combination of hardware and software, etc. In some embodiments, the navigation application 124 may perform path planning to determine or update a navigation path based on coverage areas of one or more traffic situations determined by the situation localizing application 122, generate navigation instructions corresponding to the navigation path that is adapted to the coverage areas of the traffic situations occupying the roads (e.g., suggesting a lane change maneuver), and provide the navigation instructions to the user via one or more output devices of the vehicle platform 103.

The memory(ies) 117 includes a non-transitory computer-usable (e.g., readable, writeable, etc.) medium, which can be any tangible non-transitory apparatus or device that can contain, store, communicate, propagate or transport instructions, data, computer programs, software, code, routines, etc., for processing by or in connection with the processor(s) 115. For example, the memory(ies) 117 may store the situation detecting application 120, the situation localizing application 120, and/or the navigation application 124. In some implementations, the memory(ies) 117 may include one or more of volatile memory and non-volatile memory. For example, the memory(ies) 117 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory(ies) 117 may be a single device or may include multiple types of devices and configurations.

The communication unit 119 transmits data to and receives data from other computing devices to which it is communicatively coupled (e.g., via the network 105) using wireless and/or wired connections. The communication unit 119 may include one or more wired interfaces and/or wireless transceivers for sending and receiving data. The communication unit 119 may couple to the network 105 and communicate with other computing nodes, such as other vehicle platform(s) 103 and/or server(s) 101, etc. The communication unit 119 may exchange data with other computing nodes using standard communication methods, such as those discussed above.

The sensor(s) 113 includes any type of sensors suitable for the vehicle platform(s) 103. The sensor(s) 113 may be configured to collect any type of signal data suitable to determine characteristics of the vehicle platform 103 and/or its internal and external environments. Non-limiting examples of the sensor(s) 113 include various optical sensors (CCD, CMOS, 2D, 3D, light detection and ranging (LIDAR), cameras, etc.), audio sensors, motion detection sensors, barometers, altimeters, thermocouples, moisture sensors, infrared (IR) sensors, radar sensors, other photo sensors, gyroscopes, accelerometers, speedometers, steering sensors, braking sensors, switches, vehicle indicator sensors, windshield wiper sensors, geo-location sensors, orientation sensor, wireless transceivers (e.g., cellular, WiFi™, near-field, etc.), sonar sensors, ultrasonic sensors, touch sensors, proximity sensors, distance sensors, etc. In some embodiments, one or more sensors 113 may include externally facing sensors provided at the front side, rear side, right side, and/or left side of the vehicle platform 103 in order to capture the situational context surrounding the vehicle platform 103.

In some embodiments, the sensor(s) 113 may include one or more image sensors (e.g., optical sensors) configured to record images including video images and still images, may record frames of a video stream using any applicable frame rate, and may encode and/or process the video and still images captured using any applicable methods. In some embodiments, the image sensor(s) 113 can capture images of surrounding environments within their sensor range. For example, in the context of a vehicle platform, the image sensors 113 can capture the environment around the vehicle platform 103 including roads, buildings, roadside structures, static road objects (e.g., traffic cones, barricades, traffic signs, lanes, road markings, etc.), and/or dynamic road objects (e.g., surrounding vehicle platforms 103, road workers, police officers, construction vehicles, emergency vehicles, etc.), etc. In some embodiments, the image sensors 113 may be mounted on the vehicle roof and/or inside the vehicle platform 103 to sense in any direction (forward, rearward, sideward, upward, downward facing, etc.) relative to the moving direction of the vehicle platform 103. In some embodiments, the image sensors 113 may be multidirectional (e.g., LIDAR). In some embodiments, the image sensors 113 installed on different vehicle platforms 103 may have different camera parameters and may be configured with different settings, installations, and/or configurations.

The vehicle data store 121 includes a non-transitory storage medium that stores various types of data. For example, the vehicle data store 121 may store vehicle data being communicated between different components of a given vehicle platform 103 using a bus, such as a controller area network (CAN) bus. In some embodiments, the vehicle data may include vehicle operation data collected from multiple sensors 113 coupled to different components of the vehicle platform 103 for monitoring operating states of these components, e.g., transmission, speed, acceleration, deceleration, wheel speed (Revolutions Per Minute—RPM), steering angle, braking force, etc. In some embodiments, the vehicle data may include moving direction, vehicle geolocation (e.g., GPS (Global Positioning System) coordinates) indicating geographic location of the vehicle platform 103, etc. In some embodiments, the vehicle data may also include road scene images captured by one or more image sensors 113 of the vehicle platform 103 and the image data associated with these images. In some embodiments, the image data may include an image data size indicating the data size of the road scene image, an image timestamp indicating the date and time when the road scene image is captured, etc.

In some embodiments, the vehicle data may also include sensor configurations of the sensors 113. As an example, the sensor configurations associated with each image sensor 113 of the vehicle platform 103 may include extrinsic camera parameters and intrinsic camera parameters of the image sensor. In some embodiments, the extrinsic camera parameters may indicate the sensor position and sensor orientation of the image sensor in a world coordinate system (e.g., the GPS coordinate system). Non-limiting examples of the extrinsic camera parameters may include, but are not limited to, field of view (e.g., view angle), camera height (e.g., distance from the image sensor to the ground), etc. In some embodiments, the extrinsic camera parameters of the image sensor may be represented by a rotation matrix and a translation vector.

In some embodiments, the intrinsic camera parameters may indicate internal properties of the image sensor and may be specified by camera configuration. Non-limiting examples of the intrinsic camera parameters may include, but are not limited to, focal length, resolution, distortion metric, skew coefficient, etc. In some embodiments, the intrinsic camera parameters of the image sensor may be represented by a camera intrinsic matrix. In some embodiments, the extrinsic camera parameters (e.g., the rotation matrix and the translation vector) and the intrinsic camera parameters (e.g., the camera intrinsic matrix) may be used to perform various transformations, thereby projecting a physical feature point of a situation object in the world coordinate system to a corresponding image feature point in the image coordinate system of a road scene image captured by the image sensor.

In some embodiments, the vehicle data store 121 may also store a traffic situation database that includes various situation categories. For example, the traffic situation database may include the situation category "construction scene," the situation category "accident scene," the situation category "weather-related incident," the situation category "community event," etc. In some embodiments, each situation category may be associated with a set of various object types, each object type may indicate a type of physical roadway object potentially present in the corresponding traffic situations. As an example, the situation category "construction scene" may be associated with a first set of object types including the object type "traffic cone," the object type "barricade," the object type "construction sign," the object type "construction vehicle," etc. The situation category "accident scene" may be associated with a second set of object types including the object type "barricade," the object type "police officer," the object type "road-closed sign," the object type "emergency vehicle" (e.g., ambulances, fire trucks, police cars, etc.), etc. This implementation is particularly advantageous because it allows any traffic situation to be broken down into situation objects of various object types for detection, rather than considering the entire complicated traffic situation as a whole. As a result, the detection of traffic situations can be facilitated and expedited regardless of their variations in situation components, road layouts, lighting conditions, etc.

In some embodiments, for each object type associated with a situation category, the traffic situation database may store a situation detection weight of the object type in detecting traffic situations defined by the situation category. Such situation detection weight may indicate the likelihood that the situation objects of the object type are present in the traffic situations defined by the situation category. In some embodiments, one object type may be associated with multiple situation categories and may have different situation detection weights corresponding to different situation categories. In the above example, the object type "barricade" may be associated with the situation category "construction scene" and the situation category "accident scene." In this example, the situation detection weight of the object type "barricade" in detecting traffic situations defined by the situation category "accident scene" (e.g., 0.7) may be relatively higher than the situation detection weight of the object type "barricade" in detecting traffic situations defined by the situation category "construction scene" (e.g., 0.6), because barricades more likely exist in accident situations than in construction situations.

In some embodiments, for each object type, the traffic situation database may store one or more feature templates describing object features of the situation objects that match the object type. In some embodiments, these object features may describe the visual appearance of the situation objects matching the object type (e.g., geometric shape, edges and corners, object structure, textural pattern, etc.) and may be represented in the form of Histogram of Oriented Gradients (HOG) features in the feature templates. In some embodiments, the feature templates may include one or more object templates, each object template may be corresponding to multiple part templates. In some embodiments, each object template may describe an entire situation object that matches the object type, while the corresponding part templates may describe the object portions of the same situation object. As an example, to describe a situation object that matches the object type "police officer" (e.g., a police officer making a hand signal to stop the traffic), the traffic situation database may store one object template describing the entire body of the police officer and six corresponding part templates describing six body portions of the police officer in that particular posture (e.g., one head portion, one torso portion, two arm portions, and two leg portions).

In some embodiments, the object template may describe the situation object that matches the object type with the object features at a first level of granularity (e.g., coarse scale), and the corresponding part templates may describe the same situation object with the object features at a second level of granularity higher than the first level of granularity of the object template. Therefore, the part templates may describe the object features of the situation object that matches the object type with additional details and/or at a higher resolution (e.g., fine scale) as compared to the object template. In some embodiments, because only a portion of the situation object matching the object type is described in the part template, the traffic situation database may also store the spatial position of the part templates relative to the object template. In the above example, the part template describing the head portion of the police officer may correspond to the top area of the object template, while the part templates describing the leg portions of the police officer may correspond to the bottom area of the object template.

In some embodiments, the traffic situation database may store an object detection weight of the part template in detecting the situation objects that match the object type. Such object detection weight may indicate the likelihood that the road scene image depicts a situation object matching the object type if the part template is detected in the road scene image. Continuing the above example, the part template describing the head portion of the police officer may have the object detection weight of 0.7, while the part template describing the leg portion of the police officer may have the object detection weight of 0.3. In this example, the object detection weight of the part template describing the head portion may be higher than the object detection weight of the part template describing the leg portion, because the road scene image more likely depicts a situation object of the police officer in the particular posture if the head portion is detected in the road scene image.

In some embodiments, the vehicle data store 121 may be part of a data storage system (e.g., a standard data or database management system) for storing and providing access to data. Other types of data stored in the vehicle data store 121 are also possible and contemplated.

The server 101 includes a hardware and/or virtual server that includes a processor, a memory, and network communication capabilities (e.g., a communication unit). The server 101 may be communicatively coupled to the network 105, as reflected by signal line 145. In some embodiments, the server may send and receive data to and from other entities of the system 100, e.g., one or more vehicle platforms 103. As depicted, the server 101 may include an instance of the situation detecting application 120*a*, the situation localizing application 122*a*, and/or the navigation application 124*a*. The server 101 may also include a data store 126 that stores various types of data for access and/or retrieval by these applications. For example, the data store 126 may store situation data received from the vehicle platforms 103, map database, etc. In some embodiments, the map database may include map data describing one or more geographic regions included in geographical maps. For example, the map data may divide a particular road into multiple geographic regions, each geographic region is corresponding to a predefined road segment of the particular road. In some embodiments, the map database may include a dynamic traffic situation map. The dynamic traffic situation map may be generated by the situation localizing application 122, and may describe the coverage area of multiple traffic situations (e.g., geolocation, geometric boundary (e.g., geometric shape, occupied lanes), situation objects present in the traffic situation, etc.) occurred on various road segments at various points in time.

Other variations and/or combinations are also possible and contemplated. It should be understood that the system 100 illustrated in FIG. 1 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

Figure 2:
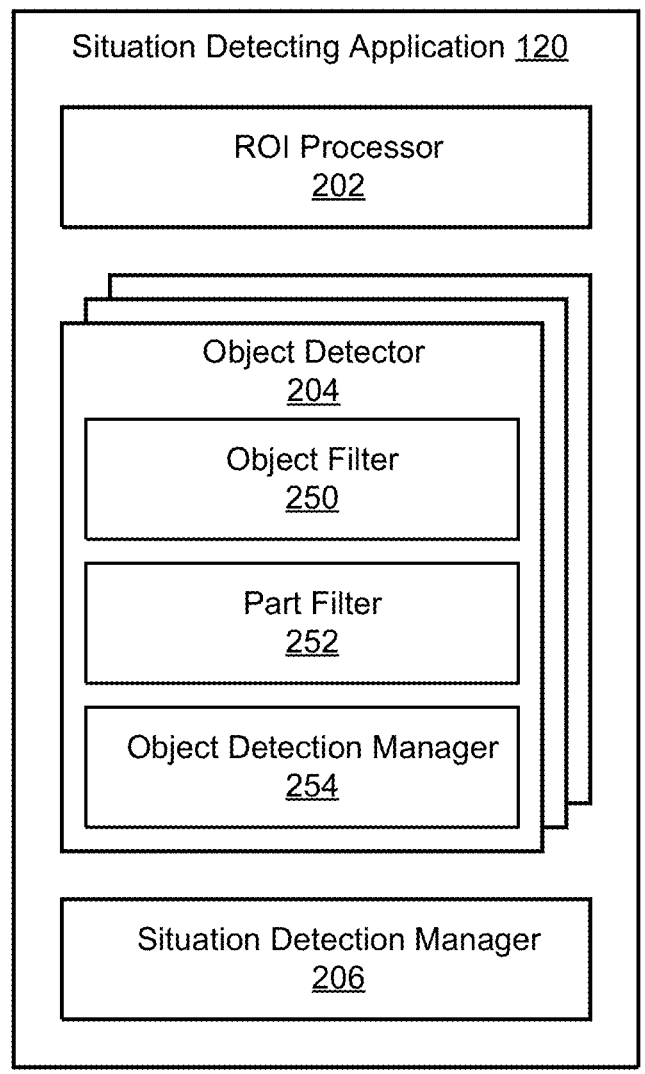
FIG. 2 is a block diagram of an example situation detecting application.

FIG. 2 is a block diagram of an example situation detecting application 120. As depicted, the situation detecting application 120 may include a ROI processor 202, one or more object detectors 204, and a situation detection manager 206. The object detector 204 may include an object filter 250, a part filter 252, and an object detection manager 254. It should be understood that the situation detecting application 120 and/or the object detector 204 may include additional components such as, but not limited to, a configuration engine, other training engines, an encryption/decryption engine, etc., and/or these various components may be combined into a single engine or divided into additional engines.

The ROI processor 202, the one or more object detectors 204, and the situation detection manager 206 may be implemented as software, hardware, or a combination of the foregoing. In some embodiments, the ROI processor 202, the one or more object detectors 204, and the situation detection manager 206 may be communicatively coupled by the bus 154 and/or the processor 115 to one another and/or the other components of the computing device 152. Similarly, the object filter 250, the part filter 252, and the object detection manager 254 included in the object detector 204 may also be implemented as software, hardware, or a combination of the foregoing. In some embodiments, the object filter 250, the part filter 252, and the object detection manager 254 may be communicatively coupled by the bus 154 and/or the processor 115 to one another, the other components of the situation detecting application 120, and/or the other components of the computing device 152. In some embodiments, one or more of the components 120, 202, 204, 206, and/or 250, 252, 254 are sets of instructions executable by the processor 115 to provide their functionality. In further embodiments, one or more of the components 120, 202, 204, 206, and/or 250, 252, 254 are storable in the memory 117 and are accessible and executable by the processor 115 to provide their functionality. In any of the foregoing embodiments, these components 120, 202, 204, 206, and/or 250, 252, 254 may be adapted for cooperation and communication with the processor 115 and other components of the computing device 152.

The situation detecting application 120, and its components 202, 204, and 206, and the components 250, 252, and 254 of the object detector 204 are described in further detail below with reference to at least FIGS. 3-6.

As discussed elsewhere herein, the situation detecting application 120 is computer logic executable to detect traffic situations depicted in road scene images. The traffic situation may be detected and categorized into a particular situation category based on the situation objects present in the road scene image. Therefore, in some embodiments, the traffic situations may be detected by extracting a ROI from the road scene image, detecting situation objects in the ROI, determining a prospective situation category based on the object types of the detected situation objects, and evaluating the related confidence scores to determine whether a traffic situation defined by the prospective situation category is depicted in the ROI. If the ROI of the road scene image is determined as depicting the traffic situation of the prospective situation category, the road scene image may be used in computing the geolocation of the traffic situation.

Figure 3:
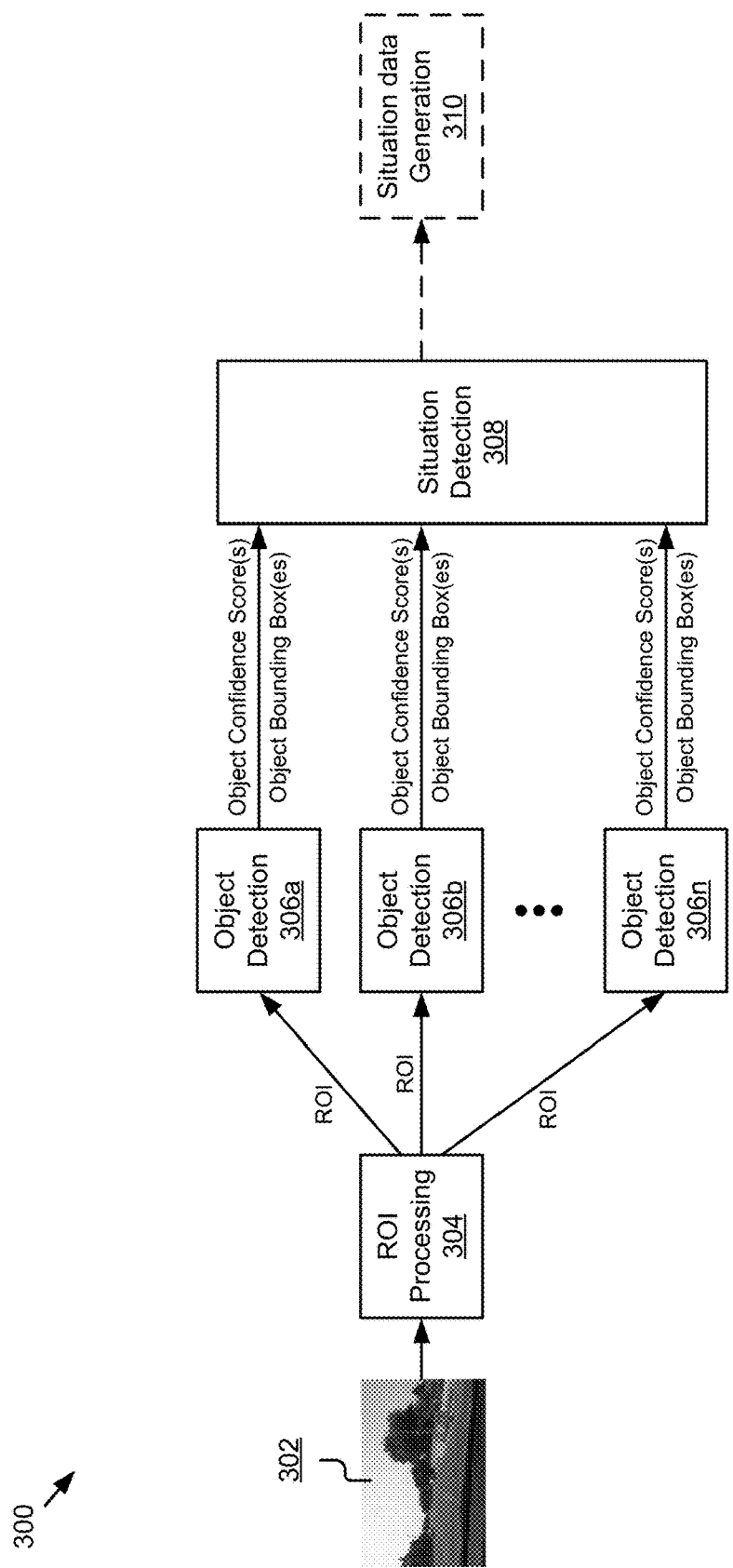
FIG. 3 is a flowchart of an example method for detecting a traffic situation.

FIG. 3 is a flowchart of an example method 300 for detecting traffic situations depicted in road scene images. In block 302, the image sensor 113 of the vehicle platform 103 may capture the road scene images depicting the roadway as the vehicle platform 103 travels along its vehicle route. The roadway may include the road segment on which the vehicle platform 103 travels and the surrounding environment. In some embodiments, these road scene images may be captured at a predefined rate/interval (e.g., every 5 seconds, 10 seconds, etc.). In block 304, the ROI processor 202 may extract one or more ROIs from a road scene image and process the extracted ROIs.

Figure 4:
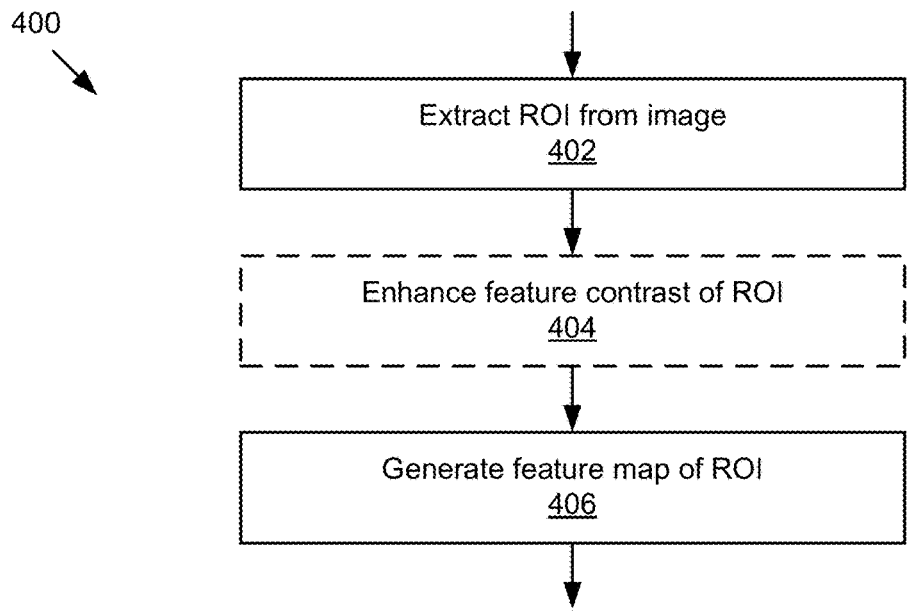
FIG. 4 is a flowchart of an example method for extracting and processing a region of interest.

By way of further illustration, FIG. 4 is a flowchart of an example method 400 for extracting and processing the ROIs. In block 402, the ROI processor 202 may extract the ROI from the road scene image. In some embodiments, the ROI processor 202 may analyze the color pattern of the road scene image to extract the ROI associated with one or more prominent colors. The situation objects existing in traffic situations often have noticeable colors to attract attention to their presence. For example, the situation objects present in construction situations usually have orange color, red orange color, and/or yellow color (e.g., traffic cones, construction signs, barricades, etc.). In another example, the situation objects present in accident situations usually have red color, blue color, black color, and/or white color (e.g., ambulances, police vehicles, emergency lights, etc.). Thus, by identifying the portion of the road scene image including prominent colors, the ROI processor 202 may extract the region of image (ROI) potentially depicting traffic situations from the road scene image.

In block 404, the ROI processor 202 may optionally enhance the feature contrast of the extracted ROI. In particular, the ROI processor 202 may adjust the grey intensity of the pixels included in the ROI to perform lighting adjustment. In some embodiments, the ROI processor 202 may compute the amount of grey intensity to be adjusted using a linear lighting function. In some embodiments, the linear lighting function may include one or more lighting adjustment parameters and may be subjected to a training process. During the training process, the linear lighting function may be applied to multiple training images in various lighting conditions to learn the optimal lighting adjustment parameters. Performing lighting adjustment on the ROI of the road scene image is particularly advantageous, because it enhances the contrast of object features depicted in the ROI and thus improving the accuracy in detecting situation objects, especially in case the road scene image is captured under limited lighting condition.

In block 406, the ROI processor 202 may generate a feature map of the ROI. In particular, the ROI processor 202 may process the ROI to generate the feature map that describes the object features of the physical roadway objects depicted in the ROI. In some embodiments, these object features may describe the visual appearance of the physical roadway objects (e.g., geometric shape, edges and corners, object structure, textural pattern, etc.), and may be represented in the form of HOG features in the feature map of the ROI.

Referring back to FIG. 3, in blocks 306a . . . 306n, multiple object detectors 204 may be executed to detect situation objects in the ROI. In some embodiments, each object detector 204 may be configured to detect situation objects that match a particular object type. The particular object type of the situation objects to be detected by each object detector 204 may be referred to herein as the object type associated with the object detector 204. In some embodiments, the object type associated with different object detectors 204 may be mutually different. For example, the first object detector 204a may be configured to detect situation objects matching the first object type "traffic cone," the second object detector 204b may be configured to detect situation objects matching the second object type "construction sign," the third object detector 204c may be configured to detect situation objects matching the third object type "emergency vehicle," etc. In some embodiments, multiple object detectors 204 may be executed in parallel. Parallel execution of multiple object detectors 204 is particularly advantageous because it allows the situation objects of various object types to be detected in the ROI simultaneously, thereby significantly reducing the amount of processing time. In addition, this implementation also provides a comprehensive detection of situation objects. As the ROI is subjected to the object detection performed by multiple object detectors 204, the situation objects of various object types potentially present in various types of traffic situations can be detected in the ROI.

In some embodiments, the first object detector 204a may be executed, and may detect in the ROI first situation object(s) matching the first object type based on object features of the first situation object(s). The first situation object(s) may reflect first physical roadway object(s) depicted in the ROI. In some embodiments, the second object detector 204b may be executed in parallel with the first object detector 204a, and may detect in the ROI second situation object(s) matching the second object type based on object features of the second situation object(s). The second situation object(s) may reflect second physical roadway object(s) depicted in the ROI. Similarly, other object detector(s) 204 may also be executed in parallel with the first object detector 204a, and may detect in the ROI the situation object(s) that match other object type(s) associated with the other object detector(s) 204 based on object features of these situation object(s). These situation object(s) may reflect other physical roadway object(s) depicted in the ROI. Continuing the above example, among multiple physical roadway objects depicted in the ROI, the first object detector 204a may detect first physical roadway object(s) as the first situation object(s) matching the first object type "traffic cone," and the second object detector 204b may detect second physical roadway object(s) as the second situation object(s) matching the second object type "construction sign."

Figure 6:
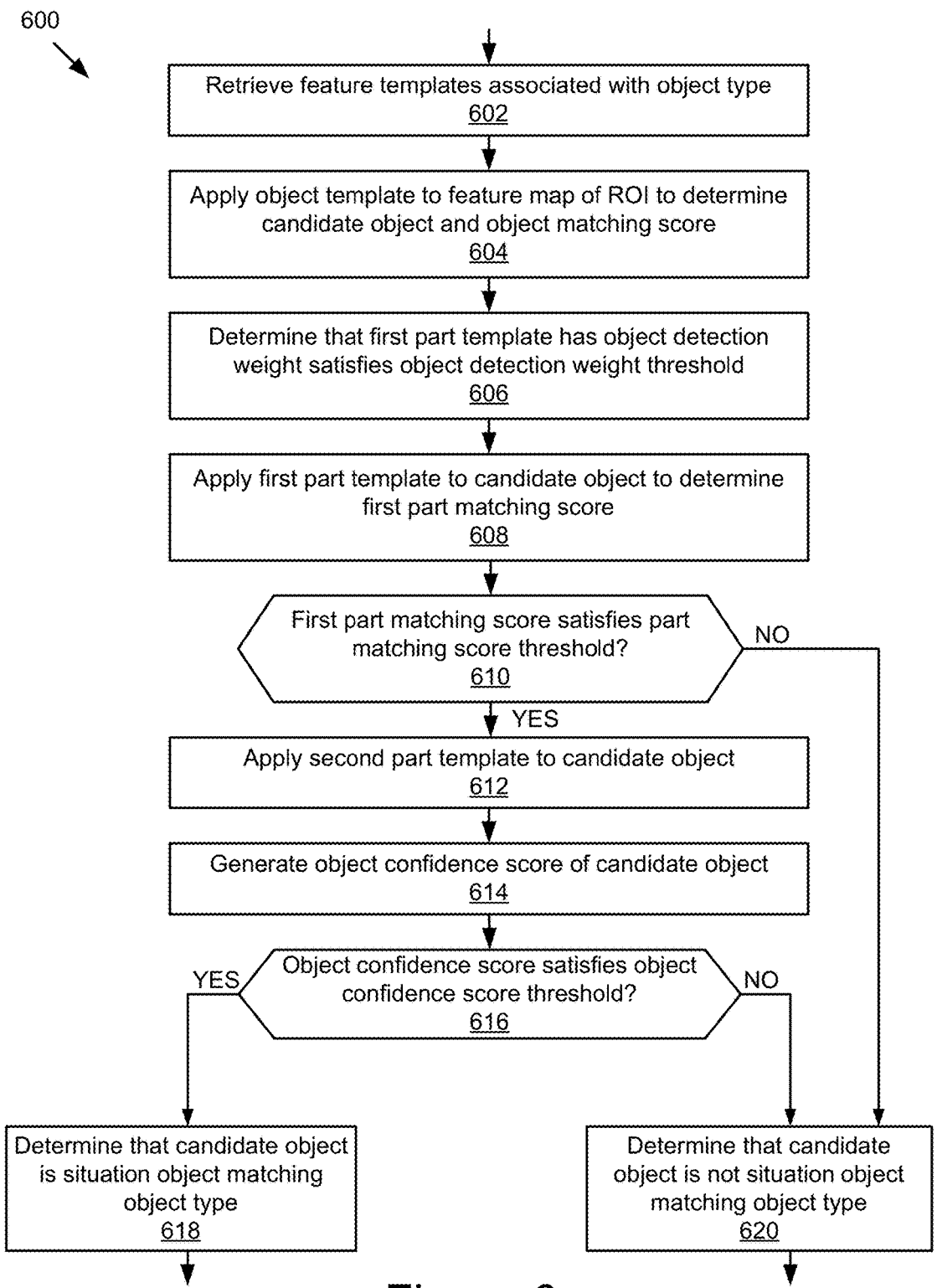
FIG. 6 is a flowchart of an example method for detecting situation objects associated with an object type.

By way of further illustration, FIG. 6 is a flowchart of an example method 600 for detecting situation objects that match an object type in the ROI. In some embodiments, the method 600 may be performed by each object detector 204 to detect the situation object(s) matching the particular object type associated with the object detector 204. For example, the first object detector 204*a* may perform the method 600 to detect the first situation object(s) matching the first object type "traffic cone" in the ROI. In block 602, the object detector 204 may retrieve the feature templates describing a situation object that matches the object type associated with object detector 204. Continuing the above example, in the first object detector 204*a*, the object filter 250 and the part filter 252 may respectively retrieve an object template and corresponding part templates associated with the first object type "traffic cone" from the vehicle data store 121. In this example, the object template may describe a complete situation object that matches the first object type "traffic cone." The corresponding part templates may include a first part template describing the top portion of the same situation object, and a second part template describing the remaining portion of the same situation object (e.g., the bottom portion).

In block 604, the object detector 204 may apply the object template to the feature map of the ROI to determine a candidate situation object that potentially matches the object type associated with the object detector 204. Continuing the above example, in the first object detector 204*a*, the object filter 250 may apply the object template as a sliding window across the feature map of the ROI to detect a candidate first object potentially matches the first object type "traffic cone." In some embodiments, the object filter 250 may also compute an object matching score indicating the level of similarity between the candidate first object and the object template (e.g., 60%).

In block 606, the object detector 204 may determine first part template(s) that have the object detection weight satisfying a predefined object detection weight threshold. In some embodiments, the object detector 204 may retrieve the object detection weight of multiple part templates corresponding to the object template from the vehicle data store 121. The detector 204 may determine the first part template(s) that have the object detection weight satisfying the predefined object detection weight threshold among the corresponding part templates. In other embodiments, the object detector 204 may determine the first part template(s) that have the highest object detection weight among the corresponding part templates. In some embodiments, the object detection weight of the part templates may be determined through a training process. During the training process, the object detector 204 may detect the situation objects matching its associated object type in various training images. The object detector 204 may adjust the object detection weight of the part templates based on the comparison of the situation objects detected in each training image to the predetermined target output associated with the training image.

Continuing the above example, in the first object detector 204*a*, the part filter 252 may retrieve the object detection weight of the first part template and the second part template that describe the situation object matching the first object type "traffic cone" from the vehicle data store 121. In this example, the part filter 252 may determine that the first part template describing the top portion of the situation object has the object detection weight of 0.75 and the second part template describing the bottom portion of the situation object has the object detection weight of 0.25. Therefore, the part filter 252 may determine that the first part template has the object detection weight satisfying the predefined object detection weight threshold (e.g., above 0.6).

In block 608, the object detector 204 may apply the first part template(s) to the candidate situation object to determine first part matching score(s) of the candidate situation object corresponding to the first part template(s). In some embodiment, the first part matching score(s) may indicate the level of similarity between the candidate situation object and the first part template(s). In block 610, the object detector 204 may determine whether the first part matching score(s) of the candidate situation object corresponding to the first part template(s) satisfy a predefined part matching score threshold. If in block 610, the object detector 204 determines that the first part matching score(s) of the candidate situation object corresponding to the first part template(s) do not satisfy the predefined part matching score threshold, the method 600 proceeds to block 620. In block 620, the object detector 204 may determine that the candidate situation object is not a situation object matching the object type associated with the object detector 204. Thus, in these embodiments, if the object portion having relatively high object detection weight is not detected in the candidate situation object, the object detector 204 can avoid applying other part templates to the candidate situation object, and expeditiously determine that the candidate situation object is not the situation object matching its associated object type. This implementation is particularly advantageous because the processing time for detecting situation objects in the ROI can be significantly reduced.

Continuing the above example, in the first object detector 204*a*, as the first part template has the object detection weight satisfying the predefined object detection weight threshold, the part filter 252 may first apply the first part template to the candidate first object. The first part template may describe the top portion of the situation object that matches the first object type "traffic cone." In this example, assuming that the part filter 252 determines the first part matching score of the candidate first object corresponding to the first part template to be 10%. Accordingly, the part filter 252 may determine that the first part matching score of the candidate first object does not satisfy the predefined part matching score threshold (e.g., above 70%), and thus the top portion of the situation object matching the first object type "traffic cone" is not present in the candidate first object. As a result, the object detection manager 254 may determine that the candidate first object is not a situation object that matches the first object type "traffic cone" without the part filter 252 applying the second part template to the candidate first object.

If in block 610, the object detector 204 determines that the first part matching score(s) of the candidate situation object corresponding to the first part template(s) satisfy the predefined part matching score threshold, the method 600 proceeds to block 612. In block 612, the object detector 204 may apply second part template(s) to the candidate situation object to determine second part matching score(s) of the candidate situation object corresponding to the second part template(s). In some embodiments, the second part template(s) may be the remaining part templates among multiple part templates corresponding to the object template. Continuing the above example, in the first object detector 204*a*, assuming that the part filter 252 determines the first part matching score of the candidate first object corresponding to the first part template to be 80%. Accordingly, the part filter 252 may determine that the first part matching score of the candidate first object satisfies the predefined part matching score threshold (e.g., above 70%), and thus the top portion of the situation object matching the first object type "traffic cone" is present in the candidate first object. The part filter 252 may then apply the second part template describing the bottom portion of the situation object matching the first object type "traffic cone" to the candidate first object. In this example, the part filter 252 may determine the second part matching score of the candidate first object corresponding to the second part template to be 45%.

In block 614, the object detector 204 may generate the object confidence score for the candidate situation object based on the level of similarity of the candidate situation object to the object type associated with the object detector 204. In some embodiments, the object detector 204 may compute the object confidence score for the candidate situation object using the object matching score of the candidate situation object to the object template, and the part matching scores of the candidate situation object to the part templates corresponding to the object template. For example, in some embodiments, the object confidence score of the candidate situation object may be directly proportional to the object matching score of the candidate situation object. In some embodiments, the object detector 204 may compute the average weighted part matching score for the candidate situation object, and the object confidence score of the candidate situation object may be directly proportional to the average weighted part matching score. In some embodiments, the average weighted part matching score for the candidate situation object may be computed using the part matching score of the candidate situation object corresponding to each part template, and the object detection weight associated with the part template. Continuing the above example, in the first object detector 204a, the object detection manager 254 may compute the average weighted part matching score for the candidate first object=(part matching score*object detection weight)/number of part templates= (80%*0.75+45%*0.25)/2=35.63%.

In some embodiments, the object detector 204 may also compute the object confidence score for the candidate situation object based on the spatial positions of the part templates relative to the corresponding object template. Continuing the above example, in the first object detector 204a, the object detection manager 254 may map the first image portion matching the first part template and the second image portion matching the second part template to the candidate first object. The object detection manager 254 may then determine whether the spatial positions of first image portion and the second image portion relative to the candidate first object conform to the spatial positions of the first part template and the second part template relative to the situation object that matches the first object type "traffic cone." In this example, the first part template may describe the top portion of the situation object matching the first object type "traffic cone" and the second part template may describe the bottom portion of the same situation object. Therefore, the first part template may be located above the second part template. In this example, assuming that the first image portion matching the first part template is located below the second image portion matching the second part template. Thus, the object detection manager 254 may determine that the spatial positions of first image portion and the second image portion do not conform to the spatial positions of the first part template and the second part template. As a result, the object detection manager 254 may determine that the candidate first object is not a situation object that matches the first object type "traffic cone," because the spatial positions of the matching object portions are incorrect. Accordingly, object detection manager 254 may generate the object confidence score for the candidate first object to be 0%.

In block 616, the object detector 204 may determine whether the object confidence score of the candidate situation object satisfies a predefined object confidence score threshold (e.g., below 20%). If in block 616, the object detector 204 determines that the object confidence score of the candidate situation object satisfies the predefined object confidence score threshold, the method 600 proceeds to block 618. In block 618, the object detector 204 may determine that the candidate situation object is a situation object matching the object type associated with the object detector 204. If in block 616, the object detector 204 determines that the object confidence score of the candidate situation object does not satisfy the predefined object confidence score threshold, the method 600 proceeds to block 620. In block 620, the object detector 204 may determine that the candidate situation object is not a situation object matching the object type associated with the object detector 204.

In some embodiment, if the candidate situation object is determined to be a situation object matching the object type associated with the object detector 204, the object detector 204 may determine the bounding box indicating the situation object in the ROI. The bounding box indicating the situation object in the ROI may encompass the image region of the ROI occupied by the candidate situation object. In some embodiment, the object detector 204 may output the bounding box indicating the situation object in the ROI and the object confidence score of the situation object. In some embodiments, object detector 204 may output the bounding box and the object confidence score of all candidate situation objects regardless of whether the object confidence score of these candidate situation objects satisfies the predefined object confidence score threshold. In some embodiments, object detector 204 may store the bounding box and the object confidence score of the situation objects detected in the ROI in the vehicle data store 121.

The object detection performed by the object detectors 204 is particularly advantageous. As described above, each object detector 204 may detect situation objects matching its associated object type in the ROI based on multiple factors (e.g., the object matching score corresponding to the object template, the part matching scores corresponding to the part templates, the object detection weight of the part templates, the spatial positions of the part templates relative to the object template, etc.). Therefore, the accuracy of the object detection can be improved. In addition, as the object detection is hierarchically performed at two levels with the application of the object template following by the application of the part templates, the situation object can be detected even if only a portion of the situation object is depicted in the ROI. It should be understood that each object detector 204 may detect in the ROI any number of situation objects matching the object type associated with the object detector 204. In the above example, the first object detector 204a may detect one or more situation objects matching the first object type "traffic cone" in the ROI, or may not detect any situation object matching the first object type "traffic cone" in the ROI.

Referring back to FIG. 3, in block 308, the situation detection manager 206 may determine whether the ROI depicts a traffic situation defined by a particular situation category based on the situation objects detected in the ROI by the object detectors 204. In some embodiments, the situation detection manager 206 may determine the prospective situation category associated with the object type(s) of the situation objects detected in the ROI. The situation detection manager 206 may reference the traffic situation database, and determine that the object type(s) detected in the ROI by the object detectors 204 are associated with the prospective situation category. As an example, assuming that the first object detector 204a configured to detect situation objects matching the first object type "traffic cone" detects 3 first situation objects (e.g., traffic cone 1, traffic cone 2, traffic cone 3) in the ROI of a first road scene image with the object confidence score of 45%, 70%, and 95%, respectively. In this example, also assuming that the second object detector 204b configured to detect situation objects matching the second object type "construction sign" detects 1 second situation object (e.g., construction sign 1) in the ROI with the object confidence score of 75%. Other object detectors 204 may determine that situation objects matching their associated object types are not present in the ROI of the first road scene image. In this example, the situation detection manager 206 may determine that the first object type "traffic cone" and the second object type "construction sign" are associated with the situation category "construction scene" in the traffic situation database. Accordingly, the situation detection manager 206 may determine the prospective situation category for the traffic situation potentially depicted in the ROI to be the situation category "construction scene."

Figure 5:
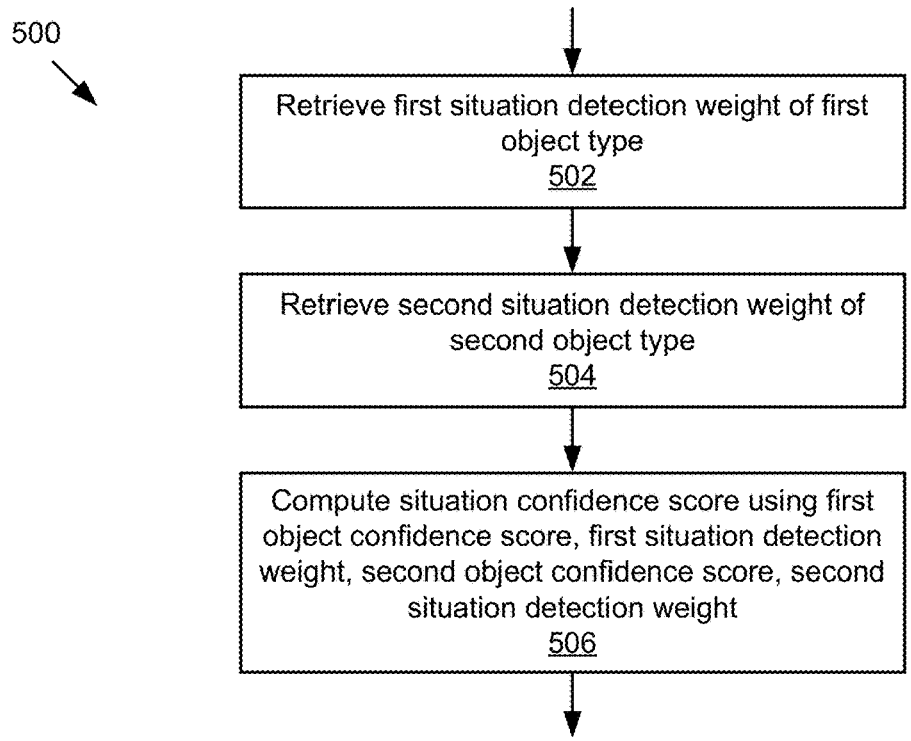
FIG. 5 is a flowchart of an example method for computing a situation confidence score associated with a region of interest.

In some embodiments, the situation detection manager 206 may combine the object confidence scores of the situation objects detected in the ROI by the object detectors 204 into a situation confidence score corresponding to the prospective situation category. Such situation confidence score may indicate a level of confidence that a traffic situation defined by the prospective situation category is depicted in the ROI. By way of further illustration, FIG. 5 is a flowchart of an example method 500 for computing the situation confidence score. In block 502, for the situation objects of the first object type detected in the ROI, the situation detection manager 206 may retrieve a first situation detection weight of the first object type in detecting traffic situations defined by the prospective situation category from the vehicle data store 121. In block 504, for the situation objects of the second object type detected in the ROI, the situation detection manager 206 may retrieve a second situation detection weight of the second object type in detecting traffic situations defined by the prospective situation category from the vehicle data store 121. For other situation objects of other object types detected in the ROI, the situation detection manager 206 may also retrieve from the vehicle data store 121 the situation detection weights of the other object types in detecting traffic situations defined by the prospective situation category.

Continuing the above example, as the first object detector 204a detects the first situation objects matching the first object type "traffic cone" in the ROI (e.g., traffic cone 1, traffic cone 2, traffic cone 3), the situation detection manager 206 may retrieve the first situation detection weight of the first object type "traffic cone" in detecting traffic situations defined by the prospective situation category "construction scene" from the vehicle data store 121 (e.g., 0.7). As the second object detector 204b detects the second situation object matching the second object type "construction sign" in the ROI (e.g., construction sign 1), the situation detection manager 206 may retrieve the second situation detection weight of the second object type "construction sign" in detecting traffic situations defined by the prospective situation category "construction scene" from the vehicle data store 121 (e.g., 1.0). In some embodiments, the situation detection weight of various object types in detecting traffic situations defined by a particular situation category may be determined through a training process. During the training process, the situation detection manager 206 may determine whether a traffic situation defined by the particular situation category is depicted in various training images. The situation detection manager 206 may adjust the situation detection weight of the object types in detecting traffic situations defined by the particular situation category based on the comparison of the traffic situation detected in each training image to the predetermined target output associated with the training image.

In block 506, the situation detection manager 206 may compute the situation confidence score of the ROI corresponding to the prospective situation category based on the first object confidence score of the first situation object(s) detected in the ROI, the first situation detection weight of their first object type in detecting traffic situations defined by the prospective situation category, the second object confidence score of the second situation object(s) detected in the ROI, and the second situation detection weight of their second object type in detecting traffic situations defined by the prospective situation category. The object confidence score of other situation objects detected in the ROI, and the situation detection weight of their object type in detecting traffic situations defined by the prospective situation category may also be used in computing the situation confidence score corresponding to the prospective situation category for the ROI of the road scene image.

In some embodiments, the situation detection manager 206 may compute the average weighted object confidence score of the ROI corresponding to the prospective situation category, and the situation confidence score of the ROI corresponding to the prospective situation category may be directly proportional to the average weighted object confidence score. In some embodiments, the average weighted object confidence score of the ROI corresponding to the prospective situation category may be computed using the object confidence score of the situation objects detected in the ROI by the object detector 204, and the situation detection weight of their object type in detecting traffic situations defined by the prospective situation category. Continuing the above example, the situation detection manager 206 may compute the average weighted object confidence score corresponding to the prospective situation category "construction scene" for the ROI in the first road scene image=Σ(object confidence score*situation detection weight)/number of situation objects=(45%*0.7+70%*0.7+90%*0.7+75%*1.0)/4=54.63%.

In some embodiments, the situation confidence score of the ROI corresponding to the prospective situation category may be directly proportional to the number of object types detected in the ROI that are associated with the prospective situation category. In the above example, the situation detection manager 206 may determine that the ROI depicts two object types associated with the prospective situation category "construction scene" (e.g., the first object type "traffic cone" and the second object type "construction sign"). In some embodiments, the situation confidence score of the ROI corresponding to the prospective situation category may be directly proportional to the number of situation objects detected in the ROI that match the object types associated with the prospective situation category. In the above example, the situation detection manager 206 may determine that the ROI depicts four situation objects of the object types associated with the prospective situation category "construction scene" (e.g., 3 first situation objects matching the first object type "traffic cone" and 1 second situation object matching the second object type "construction sign").

In some embodiments, the situation detection manager 206 may evaluate the situation confidence score of the ROI to determine whether the prospective situation category applies to the ROI of the road scene image, and that a traffic situation defined by the prospective situation category is depicted in the ROI. Continuing the above example, assuming that the situation detection manager 206 determines the situation confidence score corresponding to the prospective situation category "construction scene" for the ROI in the first road scene image to be 75%. In this example, the situation detection manager 206 may determine that the situation confidence score of the ROI corresponding to the prospective situation category "construction scene" satisfies a predefined situation confidence score threshold (e.g., above 60%). Accordingly, the situation detection manager 206 may determine that the prospective situation category "construction scene" applies to the ROI of the first road scene image, and that a traffic situation defined by the prospective situation category "construction scene" is depicted in the ROI.

In some embodiments, responsive to determining that the prospective situation category applies to the ROI of the road scene image, and that a traffic situation defined by the prospective situation category is depicted in the ROI, the situation detection manager 206 may aggregate the bounding boxes of the situation objects detected in the ROI to generate the situation region of the traffic situation. The situation region of the traffic situation may indicate the image region occupied by the traffic situation in the ROI of the road scene image. Continuing the above example, the situation detection manager 206 may aggregate the bounding boxes of the traffic cone 1, the traffic cone 2, the traffic cone 3, and the construction sign 1 detected in the ROI of the first road scene image to generate the situation region of the traffic situation defined by the situation category "construction scene" in the ROI. In some embodiments, the situation detection manager 206 may output the situation region of the ROI and the situation confidence score of the ROI corresponding to the prospective situation category. In some embodiments, the situation detection manager 206 may store the situation region of the ROI and the situation confidence score of the ROI corresponding to the prospective situation category in the vehicle data store 121.

As described above, the object detectors 204 may detect situation objects of various object types present in the ROI of the road scene image and the situation detection manager 206 may evaluate multiple situation objects detected in the ROI to determine whether the ROI depicts a traffic situation defined by a particular situation category. Accordingly, the traffic situations can be accurately detected and categorized even in case various object types associated with multiple situation categories are present in the ROI of the road scene image as illustrated in the following examples.

As a first example, the first object detector 204a configured to detect situation objects matching the first object type "traffic cone" is executed, and detects in a first ROI of a first road scene image 3 first situation objects matching the first object type "traffic cone" (e.g., traffic cone 1, traffic cone 2, traffic cone 3) with the first object confidence scores of 45%, 70%, and 95%, respectively. The second object detector 204b configured to detect situation objects matching the second object type "construction sign" is executed in parallel with the first object detector 204a, and detects 1 second situation object (e.g., construction sign 1) in the first ROI with the second object confidence score of 75%. Continuing this first example, assuming that the third object detector 204c configured to detect situation objects matching the third object type "police officer" is executed in parallel with the first object detector 204a, and detects 2 third situation objects (e.g., police officer 1, police officer 2) in the first ROI with the third object confidence scores of 60% and 65%, respectively. The fourth object detector 204d configured to detect situation objects matching the fourth object type "emergency vehicle" is executed in parallel with the first object detector 204a, and detects 1 fourth situation object (e.g., emergency vehicle 1) in the first ROI with the fourth object confidence score of 85%.

In this first example, 7 situation objects of 4 different object types are detected in the first ROI of the first road scene image. In some embodiments, the situation detection manager 206 may reference the traffic situation database, and determine that the first object type "traffic cone" and the second object type "construction sign" are associated with the situation category "construction scene" in the traffic situation database, while the third object type "police officer" and the fourth object type "emergency vehicle" are associated with the situation category "accident scene" in the traffic situation database. Accordingly, the situation detection manager 206 may determine the first prospective situation category for a first traffic situation potentially depicted in the first ROI to be the situation category "construction scene," and determine the second prospective situation category for a second traffic situation potentially depicted in the first ROI to be the situation category "accident scene."

In some embodiments, as discussed elsewhere herein, the situation detection manager 206 may combine the first object confidence scores of the first situation objects matching the first object type "traffic cone" (e.g., traffic cone 1, traffic cone 2, traffic cone 3) and the second object confidence score of the second situation object matching the second object type "construction sign" (e.g., construction sign 1) into a first situation confidence score of the first ROI corresponding to the first prospective situation category "construction scene" (e.g., 75%). The situation detection manager 206 may also combine the third object confidence scores of the third situation objects matching the third object type "police officer" (e.g., police officer 1, police officer 2) and the fourth object confidence score of the fourth situation object matching the fourth object type "emergency vehicle" (e.g., emergency vehicle 1) into a second situation confidence score of the first ROI corresponding to the second prospective situation category "accident scene" (e.g., 70%).

In some embodiments, as discussed elsewhere herein, the situation detection manager 206 may evaluate the first situation confidence score of the first ROI corresponding to the first prospective situation category "construction scene" (e.g., 75%) and the second situation confidence score of the first ROI corresponding to the second prospective situation category "accident scene" (e.g., 70%). For example, the situation detection manager 206 may determine that the first situation confidence score of the first ROI and the second situation confidence score of the first ROI both satisfy the predefined situation confidence score threshold (e.g., above 60%). Accordingly, the situation detection manager 206 may determine that the first prospective situation category "construction scene" applies to the first ROI, and the second prospective situation category "accident scene" also applies to the first ROI. Thus, the situation detection manager 206 may determine that a first traffic situation defined by the first prospective situation category "construction scene" and a second traffic situation defined by the second prospective situation category "accident scene" are depicted in the first ROI (e.g., the road construction and the traffic accident occur at the same geographical location). In this first example, multiple traffic situations defined by different situation categories may be detected in the same first ROI of the first road scene image.

As a second example, the first object detector 204a is executed, and detects in a second ROI of a second road scene image 3 first situation objects matching the first object type "traffic cone" (e.g., traffic cone 1, traffic cone 2, traffic cone 3) with the first object confidence scores of 45%, 70%, and 95%, respectively. The second object detector 204b is executed in parallel with the first object detector 204a, and detects 1 second situation object (e.g., construction sign 1) in the second ROI with the second object confidence score of 75%. Continuing this second example, assuming that the third object detector 204c is executed in parallel with the first object detector 204a, and detects 2 third situation objects (e.g., police officer 1, police officer 2) in the second ROI with the third object confidence scores of 35% and 30%, respectively. The fourth object detector 204d is executed in parallel with the first object detector 204a, and detects 1 fourth situation object (e.g., emergency vehicle 1) in the second ROI with the fourth object confidence score of 30%. In this second example, assuming that the third situation objects depicted in the second ROI are actually road workers rather than police officers, and the fourth situation object depicted in the second ROI is in fact a regular van rather than an emergency vehicle. Thus, the third object confidence scores of the third situation objects computed by the third object detector 204c and the fourth object confidence score of the fourth situation object computed by the fourth object detector 204d may be relatively low.

In this second example, 7 situation objects of 4 different object types are detected in the second ROI of the second road scene image. In some embodiments, the situation detection manager 206 may reference the traffic situation database, and determine that the first object type "traffic cone" and the second object type "construction sign" are associated with the situation category "construction scene" in the traffic situation database, while the third object type "police officer" and the fourth object type "emergency vehicle" are associated with the situation category "accident scene" in the traffic situation database. Accordingly, the situation detection manager 206 may determine the first prospective situation category for a first traffic situation potentially depicted in the second ROI to be the situation category "construction scene," and determine the second prospective situation category for a second traffic situation potentially depicted in the second ROI to be the situation category "accident scene."

In some embodiments, the situation detection manager 206 may combine the first object confidence scores of the first situation objects matching the first object type "traffic cone" (e.g., traffic cone 1, traffic cone 2, traffic cone 3) and the second object confidence score of the second situation object matching the second object type "construction sign" (e.g., construction sign 1) into a first situation confidence score of the second ROI corresponding to the first prospective situation category "construction scene" (e.g., 75%). The situation detection manager 206 may also combine the third object confidence scores of the third situation objects matching the third object type "police officer" (e.g., police officer 1, police officer 2) and the fourth object confidence score of the fourth situation object matching the fourth object type "emergency vehicle" (e.g., emergency vehicle 1) into a second situation confidence score of the second ROI corresponding to the second prospective situation category "accident scene" (e.g., 30%).

In some embodiments, as discussed elsewhere herein, the situation detection manager 206 may evaluate the first situation confidence score of the second ROI corresponding to the first prospective situation category "construction scene" (e.g., 75%) and the second situation confidence score of the second ROI corresponding to the second prospective situation category "accident scene" (e.g., 30%). For example, the situation detection manager 206 may determine that the first situation confidence score of the second ROI satisfies the predefined situation confidence score threshold (e.g., above 60%), while the second situation confidence score of the second ROI does not. Accordingly, the situation detection manager 206 may determine that the first prospective situation category "construction scene" applies to the second ROI, and the second prospective situation category "accident scene" does not apply to the second ROI. Thus, the situation detection manager 206 may determine that a first traffic situation defined by the first prospective situation category "construction scene" is depicted in the second ROI, and no traffic situation defined by the second prospective situation category "accident scene" is depicted in the second ROI. In this second example, although the situation detection manager 206 may determine multiple prospective situation categories based on the situation objects of various object types present in the second ROI, the situation detection manager 206 may determine that only the traffic situation defined by the first prospective situation category "construction scene" is depicted in the second ROI of the second road scene image.

As a third example, the first object detector 204a configured to detect situation objects matching the first object type "traffic cone" is executed, and detects in a third ROI of a third road scene image 3 first situation objects matching the first object type "traffic cone" (e.g., traffic cone 1, traffic cone 2, traffic cone 3) with the first object confidence scores of 45%, 70%, and 95%, respectively. The fifth object detector 204e configured to detect situation objects matching the fifth object type "barricade" is executed in parallel with the first object detector 204a, and detects 2 second situation objects (e.g., barricade 1, barricade 2) in the third ROI with the second object confidence scores of 65% and 75%, respectively. Continuing this third example, assuming that the third object detector 204c configured to detect situation objects matching the third object type "police officer" is executed in parallel with the first object detector 204a, and detects 2 third situation objects (e.g., police officer 1, police officer 2) in the third ROI with the third object confidence scores of 35% and 30%, respectively. In this third example, assuming that the third situation objects depicted in the third ROI are actually road workers rather than police officers, and thus the third object confidence scores of the third situation objects computed by the third object detector 204c may be relatively low.

In this third example, 7 situation objects of 3 different object types are detected in the third ROI of the third road scene image. In some embodiments, the situation detection manager 206 may reference the traffic situation database, and determine that the first object type "traffic cone" and the fifth object type "barricade" are associated with the situation category "construction scene" in the traffic situation database, while the fifth object type "barricade" and the third object type "police officer" are associated with the situation category "accident scene" in the traffic situation database.

Accordingly, the situation detection manager 206 may determine the first prospective situation category for a first traffic situation potentially depicted in the third ROI to be the situation category "construction scene," and determine the second prospective situation category for a second traffic situation potentially depicted in the third ROI to be the situation category "accident scene." In this third example, the fifth object type "barricade" may be associated with both the situation category "construction scene" and the situation category "accident scene." As discussed elsewhere herein, the situation detection weight of the object type "barricade" in detecting traffic situations defined by the situation category "accident scene" (e.g., 0.7) may be relatively higher than the situation detection weight of the object type "barricade" in detecting traffic situations defined by the situation category "construction scene" (e.g., 0.6), because barricades more likely exist in accident situations than in construction situations.

In some embodiments, the situation detection manager 206 may combine the first object confidence scores of the first situation objects matching the first object type "traffic cone" (e.g., traffic cone 1, traffic cone 2, traffic cone 3) and the second object confidence scores of the second situation objects matching the fifth object type "barricade" (e.g., barricade 1, barricade 2) into a first situation confidence score of the third ROI corresponding to the first prospective situation category "construction scene" (e.g., 70%). The situation detection manager 206 may also combine the second object confidence scores of the second situation objects matching the fifth object type "barricade" (e.g., barricade 1, barricade 2) and the third object confidence scores of the third situation objects matching the third object type "police officer" (e.g., police officer 1, police officer 2) into a second situation confidence score of the third ROI corresponding to the second prospective situation category "accident scene" (e.g., 40%).

In some embodiments, the situation detection manager 206 may evaluate the first situation confidence score of the third ROI corresponding to the first prospective situation category "construction scene" (e.g., 70%) and the second situation confidence score of the third ROI corresponding to the second prospective situation category "accident scene" (e.g., 40%). For example, the situation detection manager 206 may determine that the first situation confidence score of the third ROI satisfies the predefined situation confidence score threshold (e.g., above 60%), while the second situation confidence score of the third ROI does not. Accordingly, the situation detection manager 206 may determine that the first prospective situation category "construction scene" applies to the third ROI, and the second prospective situation category "accident scene" does not apply to the third ROI. Thus, the situation detection manager 206 may determine that a first traffic situation defined by the first prospective situation category "construction scene" is depicted in the third ROI, and no traffic situation defined by the second prospective situation category "accident scene" is depicted in the third ROI. In this third example, the fifth object type "barricade" of the second traffic situations detected in the third ROI may be associated with both situation category "construction scene" and situation category "accident scene," and may have a higher object detection weight in detecting traffic situations defined by the situation category "accident scene." However, based on the first situation confidence score and the second situation confidence score generated from multiple factors for the third ROI, the situation detection manager 206 may determine that only the first traffic situation defined by the first prospective situation category "construction scene" is depicted in the third ROI of the third road scene image.

As a fourth example, the first object detector 204a configured to detect situation objects matching the first object type "traffic cone" is executed, and detects in a fourth ROI of a fourth road scene image 2 first situation objects matching the first object type "traffic cone" (e.g., traffic cone 1, traffic cone 2) with the first object confidence scores of 35% and 40%, respectively. The second object detector 204b configured to detect situation objects matching the second object type "construction sign" is executed in parallel with the first object detector 204a, and detects 1 second situation object (e.g., construction sign 1) in the fourth ROI with the second object confidence score of 50%. In this fourth example, 3 situation objects of 2 different object types are detected in the fourth ROI of the fourth road scene image. In some embodiments, the situation detection manager 206 may reference the traffic situation database, and determine that the first object type "traffic cone" and the second object type "construction sign" are associated with the situation category "construction scene" in the traffic situation database. Accordingly, the situation detection manager 206 may determine the first prospective situation category for a first traffic situation potentially depicted in the fourth ROI to be the situation category "construction scene."

In some embodiments, the situation detection manager 206 may combine the first object confidence scores of the first situation objects matching the first object type "traffic cone" (e.g., traffic cone 1, traffic cone 2) and the second object confidence score of the second situation object matching the second object type "construction sign" (e.g., construction sign 1) into a first situation confidence score of the fourth ROI corresponding to the first prospective situation category "construction scene" (e.g., 40%). In this fourth example, the situation detection manager 206 may determine that the first situation confidence score of the fourth ROI does not satisfy the predefined situation confidence score threshold (e.g., above 60%). Accordingly, the situation detection manager 206 may determine that the prospective situation category "construction scene" does not apply to the fourth ROI, and thus, the situation detection manager 206 may determine that the first traffic situation defined by the first prospective situation category "construction scene" is not depicted in the fourth ROI of the fourth road scene image.

Continuing the fourth example, the image sensor of the vehicle platform 103 may capture a fifth road scene image subsequent to the fourth road scene image (e.g., is later), and thus the fifth road scene image may depict substantially the same roadway. The ROI processor 202 may extract a fifth ROI from a fifth road scene image. In some embodiments, the first object detector 204a configured to detect situation objects matching the first object type "traffic cone" is executed, and detects in the fifth ROI of the fifth road scene image 3 first situation objects matching the first object type "traffic cone" (e.g., traffic cone 3, traffic cone 4, traffic cone 5) with the first object confidence scores of 75%, 85%, and 80%, respectively. The second object detector 204b configured to detect situation objects matching the second object type "construction sign" is executed in parallel with the first object detector 204a, and detects 2 second situation objects (e.g., construction sign 2, construction sign 3) in the fifth ROI with the second object confidence score of 90% and 80%, respectively.

In this fourth example, 5 situation objects of 2 different object types are detected in the fifth ROI of the fifth image.

The object types of the situation objects detected in the fifth ROI of the fifth image are the same as the object types of the situation objects detected in the fourth ROI of the fourth image (e.g., the first object type "traffic cone" and the second object type "construction sign"). Similar to processing the fourth ROI of the fourth road scene image, the situation detection manager 206 may determine the first prospective situation category for the first traffic situation potentially depicted in the fifth ROI to be the situation category "construction scene." In some embodiments, the situation detection manager 206 may combine the first object confidence scores of the first situation objects matching the first object type "traffic cone" (e.g., traffic cone 3, traffic cone 4, traffic cone 5) and the second object confidence scores of the second situation objects matching the second object type "construction sign" (e.g., construction sign 2, construction sign 3) into a second situation confidence score of the fifth ROI corresponding to the prospective situation category "construction scene" (e.g., 85%). In this fourth example, the situation detection manager 206 may determine that the second situation confidence score of the fifth ROI satisfies the predefined situation confidence score threshold (e.g., above 60%). Accordingly, the situation detection manager 206 may determine that the prospective situation category "construction scene" applies to the fifth ROI, and thus, the situation detection manager 206 may determine that the first traffic situation defined by the prospective situation category "construction scene" is depicted in the fifth ROI of the fifth road scene image.

In this fourth example, the vehicle platform 103 may capture the fourth road scene image from a distance $d_1$ (e.g., 100 m) to the first traffic situation. Therefore, the fourth ROI of the fourth road scene image may depict only a limited number of situation objects present in first traffic situation with limited object size (e.g., traffic cone 1, traffic cone 2, construction sign 1). As a result, the object confidence scores and the situation confidence score computed for the fourth ROI may be relatively low, and thus the situation detection manager 206 may determine that the first traffic situation defined by the first prospective situation category "construction scene" is not depicted in the fourth ROI of the fourth road scene image. As the vehicle platform 103 is approaching the first traffic situation, the vehicle platform 103 may capture the fifth road scene image from a distance $d_2$ (e.g., 25 m) smaller than the distance $d_1$. Therefore, the fifth ROI of the fifth road scene image may capture more situation objects present in the first traffic situation (traffic cone 3, traffic cone 4, traffic cone 5, construction sign 2) and may depict the situation objects with higher image resolution (e.g., less blurry, bigger object size). As a result, the object confidence scores and the situation confidence score computed for the fifth ROI may be relatively high, and thus the situation detection manager 206 may determine that the first traffic situation defined by the first prospective situation category "construction scene" is depicted in the fifth ROI of the fifth road scene image.

Referring back to FIG. 3, if in block 308, the situation detection manager 206 determines that the ROI of the road scene image depicts a traffic situation defined by a particular situation category, the road scene image may be used to localize the traffic situation. In block 310, the situation detection manager 206 may generate the situation data describing the traffic situation depicted in the ROI of the road scene image. As the road scene image is captured by the image sensor of the vehicle platform 103, the situation data may describe the traffic situation as perceived from the perspective of the vehicle platform 103. In some embodiments, the situation detection manager 206 may retrieve various types of data associated with the road scene image from the vehicle data store 121, and aggregate the data retrieved from the vehicle data store 121 in a predefined format to generate the situation data.

In some embodiments, the situation data may include the road scene image, the image data associated with the road scene image (e.g., the image timestamp, the image data size, etc.), the sensor configurations of the image sensor 113 capturing the road scene image (e.g., the extrinsic camera parameters, the intrinsic camera parameters, etc.), and the geolocation data of the vehicle platform 103 associated with the road scene image. The geolocation data associated with the road scene image may indicate the vehicle geolocation (e.g., GPS coordinates) of the vehicle platform 103 when the road scene image was captured and may be retrieved using the image timestamp. In some embodiments, the situation data may also include the object bounding boxes and the object confidence scores of one or more situation objects detected in the ROI of the road scene image. In some embodiments, the situation data may also include the situation region of the ROI and the situation confidence score of the ROI corresponding to the prospective situation category. Other types of situation data are also possible and contemplated.

In some embodiments, as the situation data is generated by the situation detection manager 206, the situation detecting application 120 may transmit the situation data to the situation localizing application 122. In some embodiments, the situation localizing application 122 may be included in the processing entity of the system 100 (e.g., the server 101), and may receive the situation data from multiple vehicle platforms 103. In particular, each vehicle platform 103 may capture road scene images as the vehicle platform 103 travels along its vehicle route. The situation detecting application 120 included in the vehicle platform 103 may determine whether the road scene image captured by the vehicle platform 103 depicts a traffic situation defined by a prospective situation category (e.g., the situation category "construction scene") as discussed above. If the road scene image is determined as depicting the traffic situation, the situation detecting application 120 may generate the situation data describing the traffic situation depicted in the road scene image as locally perceived from the individual perspective of the vehicle platform 103, and transmit the situation data to the situation localizing application 122 included in the server 101. In some embodiments, the situation localizing application 122 may store the situation data received from multiple vehicle platforms 103 in the data store 126.

In some embodiments, the situation localizing application 122 may localize the traffic situations using the road scene images received from the vehicle platforms 103. In particular, the situation localizing application 122 may determine the coverage area of the traffic situations on the geographical map using the situation data of the road scene images. In some embodiments, the situation localizing application 122 may process the situation data received from each vehicle platform 103 to extract the road scene image captured by the image sensor of the vehicle platform 103, the image data associated with the road scene image, the vehicle geolocation of the vehicle platform 103 associated with the road scene image, and the sensor configurations of the image sensor 113 capturing the road scene image. In some embodiments, the situation localizing application 122 may also extract from the situation data the object bounding boxes and the object confidence scores of one or more situation objects detected in the ROI of the road scene image. In some embodiments, the situation localizing application 122 may also extract from the situation data the situation region of the ROI and the situation confidence score of the ROI corresponding to the prospective situation category.

In some embodiments, the situation localizing application 122 may cluster the road scene images included in the situation data of one or more vehicle platforms 103 that are located in a certain geographic region from among the vehicle platforms 103. In particular, the situation localizing application 122 may retrieve the map data describing the geographic regions (e.g., predefined road segments) from the map database in the data store 126, and the vehicle geolocation (e.g., GPS coordinates) extracted from the situation data of the vehicles platforms 103. The situation localizing application 122 may map the vehicle geolocation of the vehicle platforms 103 to the geographic regions, and determine one or more vehicles platforms 103 that are located in the same geographic region from among the vehicles platforms 103. The road scene images extracted from the situation data of the vehicles platforms 103 located in the same geographic region may be clustered into one image cluster. As a result, the road scene images in the same image cluster may depict the same traffic situation in the geographic region, but from various perspectives and with various camera configurations corresponding to multiple vehicles platforms 103 located in the geographic region. In some embodiments, the situation localizing application 122 may also cluster the road scene images extracted from the situation data based on the image timestamp of the road scene images. As a result, the image cluster may include the road scene images captured within the same time window by the image sensors of the vehicles platforms 103 located in the same geographic region.

In some embodiments, the situation localizing application 122 may match road scene images from different vehicle platforms 103 in the image cluster. The matched road scene images may have one or more corresponding features of one or more situation objects. For example, the situation localizing application 122 may match a first image captured by a first image sensor of a first vehicle platform 103 to a second image captured by a second image sensor of a second vehicle platform 103. The first image and the second image may be included in the same image cluster, and the first image sensor capturing the first image may have different sensor configurations (e.g., different extrinsic camera parameters and/or different intrinsic camera parameters) from the second image sensor capturing the second image.

In particular, the situation localizing application 122 may determine one or more features describing a first situation object indicated by a first object bounding box in the first image. In some embodiments, the features may include one or more first image feature points describing the object appearance (e.g., object landmarks, boundaries, structure, shape, size, etc.) of the first situation object in the first image. In some embodiments, the situation localizing application 122 may determine second image feature points in the second image that match the first image feature points in the first image. For example, the situation localizing application 122 may compare various aspects of the first image feature points and the second image feature points (e.g., pixel color, brightness value, shape, etc.) to generate a similarity score. If the similarity score indicating the similarity between the first image feature points and the second image feature points satisfies a predetermined similarity threshold, the situation localizing application 122 may determine that the second image feature points in the second image are corresponding to the first image feature points in the first image, and thus match the second image to the first image in the image cluster. In some embodiments, the corresponding features in the first image and the second image may be identified using deep learning algorithms.

In some embodiments, a first image feature point $P_1$ in a first image and a second image feature point $P_2$ in a second image that match the first image feature point $P_1$ may be the projections of the same physical feature point P of a first situation object onto the first image and the second image respectively. In some embodiments, the first image may be captured by the first image sensor of the first vehicle platform 103 having the first sensor configurations, and the second image may be captured by the second image sensor of the second vehicle platform 103 having the second sensor configurations. Therefore, the first image including the first image feature point $P_1$ may be associated with a first camera coordinate system $(X_1, Y_1, Z_1)$ of the first image sensor, and the second image including the second image feature point $P_2$ may be associated with a second camera coordinate system $(X_2, Y_2, Z_2)$ of the second image sensor. In some embodiments, the first camera coordinate system $(X_1, Y_1, Z_1)$ of the first image sensor may be a three dimensional (3D) coordinate system with a first point of origin $C_1$ indicating a first sensor position of the first image sensor when the first image is captured. In some embodiments, the geolocation coordinates (e.g., GPS coordinates) of the first point of origin $C_1$ may be the geolocation coordinates of the first vehicle platform 103 when capturing the first image. Similarly, the second camera coordinate system $(X_2, Y_2, Z_2)$ of the second image sensor may be a 3D coordinate system with a second point of origin $C_2$ indicating a second sensor position of the second image sensor when the second image is captured. The geolocation coordinates (e.g., GPS coordinates) of the second point of origin $C_2$ may be the geolocation coordinates of the second vehicle platform 103 when capturing the second image.

In some embodiments, the situation localizing application 122 may randomly select a target vehicle platform from the vehicle platforms 103 associated with at least one matched image, and use the camera coordinate system of the image sensor associated with the target vehicle platform as a target camera coordinate system. For example, situation localizing application 122 may select the first vehicle platform 103 associated with the first image to be the target vehicle. Thus, the target camera coordinate system may be the first camera coordinate system $(X_1, Y_1, Z_1)$ of the first image sensor associated with the first vehicle platform 103.

In some embodiments, the situation localizing application 122 may perform coordinate transformation to transform the coordinates of the first image feature point $P_1$ and/or the coordinates of the second image feature point $P_2$ into the same camera coordinate system, e.g., the target camera coordinate system $(X_1, Y_1, Z_1)$. In some embodiments, the coordinate transformations performed by the situation localizing application 122 may include transforming the 2D image coordinates of the image feature point in the image coordinate system of the image to the 3D camera coordinates of the image feature point in the camera coordinate system of the corresponding image sensor capturing the image. The coordinate transformations performed by the camera coordinates processor 206 may also include transforming the 3D camera coordinates of the image feature point in the camera coordinate system of the corresponding image sensor to the 3D camera coordinates of the image feature point in the target camera coordinate system. In some embodiments, these coordinate transformations may be performed using the sensor configurations (e.g., the extrinsic camera parameters and the intrinsic camera parameters) of the first image sensor and the second image sensor.

As a result of the coordinate transformations, the first image feature point $P_1$, the second image feature point $P_2$, the first point of origin $C_1$, and the second point of origin $C_2$ are associated with the same target camera coordinate system $(X_1, Y_1, Z_1)$. In some embodiments, the situation localizing application 122 may determine the 3D camera coordinates of the physical feature point P in the target camera coordinate system $(X_1, Y_1, Z_1)$ based on the first image feature point $P_1$ and the second image feature point $P_2$. Accordingly, the physical feature point P, the first point of origin $C_1$, and the second point of origin $C_2$ are associated with the same target camera coordinate system (e.g., the first camera coordinate system $(X_1, Y_1, Z_1)$) and their 3D camera coordinates in the first camera coordinate system $(X_1, Y_1, Z_1)$ are determined. Therefore, the physical feature point P, the first point of origin $C_1$, and the second point of origin $C_2$ may form a triangle based on their 3D camera coordinates in the first camera coordinate system $(X_1, Y_1, Z_1)$. Thus, the situation localizing application 122 may compute the geolocation coordinates (e.g., GPS coordinates) the physical feature point P based on the geolocation coordinates of the first point of origin $C_1$ and the geolocation coordinates of the second point of origin $C_2$ using triangulation computation.

In some embodiments, the situation localizing application 122 may position the physical feature point P of the first related situation object on the geographical map using the geolocation coordinates (e.g., the GPS coordinates) of the physical feature point P. As multiple physical feature points of the first situation object are placed on the geographical map, the first situation object may be projected on the geographical map at its accurate geographic location. In some embodiments, the situation localizing application 122 may determine the coverage area of the traffic situation based on the geolocation coordinates of the situation objects. For example, the situation geolocation calculator 208 may determine a convex geographical area encompassing the situation objects on the geographic map to be the coverage area of the traffic situation. The coverage area of the traffic situation may indicate the geographic location of the traffic situation, the geometric boundary (e.g., geometric shape, occupied lanes) of the traffic situation, the situation components (e.g., the situation objects present in the traffic situation), the distributions of these situation objects, etc.

In some embodiments, the navigation application 124 may use the coverage area of the traffic situation computed by the situation localizing application 122 to perform path planning. For example, the navigation application 124 may provide a navigational suggestion to its user to make a lane change maneuver to avoid the coverage area of the traffic situation occupying the road. In some embodiments, the situation localizing application 122 may monitor the traffic situation and update the coverage area representing the traffic situation in the geographical map as the traffic situation dynamically changes over time. In some embodiments, the situation localizing application 122 may generate and maintain the dynamic traffic situation map describing multiple traffic situations occurred on various road segments and their development status over time (e.g., start, end, expansion and/or reduction of the coverage area, etc.). In some embodiments, the situation localizing application 122 may store the dynamic traffic situation map in the data store 126. In some embodiments, the navigation application 124 included in each vehicle platform 103 may retrieve the dynamic traffic situation map from the data store 126, process the dynamic traffic situation map to obtain the coverage area of one or more traffic situations occurred in various road segments, and calculate the optimal vehicle route for the vehicle platform 103 to get to its destination accordingly.

In some embodiments, as the coverage area of the traffic situation is changed from a first coverage area to a second coverage area, the situation localizing application 122 may provide a notification of situation update including the second coverage area of the traffic situation to the navigation application 124. In some embodiments, the notification of situation update may be transmitted to the navigation application 124 included in the vehicle platforms 103 currently proximate to the traffic situation (e.g., the vehicle platforms 103 travelling within the radius of 2 miles from the geolocation of the traffic situation). In some embodiments, the navigation application 124 included in the proximate vehicle platforms 103 may automatically perform route recalculation to adapt the current vehicle route to the second coverage area of the traffic situation. In some embodiments, the navigation application 124 may also generate and display notifications, alerts, navigation guidance, description information, etc. corresponding to the second coverage area of the traffic situation to the driver via one or more output devices of the proximate vehicle platforms 103. For example, the navigation application 124 may display a dynamic graphical map distinctively representing the first coverage area and the second coverage area of the traffic situation on a touch screen with multiple route options to get around the traffic situation. As the driver provides a user input to select a route option from the multiple route options (e.g., issue a voice command, interact with the touch screen, etc.), the navigation application 124 may provide navigation guidance corresponding to the selected route option for the driver to follow and proceed through the road segment on which the traffic situation occupies.

In the above description, for purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A method comprising:
    extracting a region of interest (ROI) from an image depicting a roadway;
    executing a first object detector that detects, in the ROI, a first situation object matching a first object type based on object features of the first situation object, the first situation object reflecting a first physical roadway object depicted in the ROI;
    generating a first object confidence score for the first situation object based on a level of similarity between the first situation object and the first object type;
    executing, in parallel with the first object detector, a second object detector that detects, in the ROI, a second situation object matching a second object type that is different from the first object type based on object features of the second situation object, the second situation object reflecting a second physical roadway object depicted in the ROI;

generating a second object confidence score for the second situation object based on a level of similarity between the second situation object and the second object type;
determining that the first object type detected by the first object detector and the second object type detected by the second object detector are associated with a first prospective situation category;
combining the first object confidence score and the second object confidence score into a first situation confidence score corresponding to the first prospective situation category; and
evaluating the first situation confidence score to determine that the first prospective situation category applies to the ROI and that a first traffic situation defined by the first prospective situation category is depicted in the ROI.

2. The method of claim 1, further comprising:
determining a first bounding box indicating the first situation object in the ROI;
determining a second bounding box indicating the second situation object in the ROI; and
aggregating the first bounding box indicating the first situation object and the second bounding box indicating the second situation object to generate a situation region of the first traffic situation depicted in the ROI.

3. The method of claim 1, wherein extracting the ROI from the image includes:
extracting, from the image, the ROI associated with a prominent color.

4. The method of claim 1, wherein:
the first prospective situation category is associated with a first set of object types in a data store, the first set of object types including the first object type detected by the first object detector and the second object type detected by the second object detector; and
a second prospective situation category is associated with a second set of object types in the data store, the second set of object types including a third object type detected by a third object detector and a fourth object type detected by a fourth object detector, the third object type being different from the fourth object type.

5. The method of claim 1, further comprising:
executing, in parallel with the first object detector, a third object detector that detects, in the ROI, a third situation object matching a third object type based on object features of the third situation object, the third situation object reflecting a third physical roadway object depicted in the ROI;
generating a third object confidence score for the third situation object based on a level of similarity between the third situation object and the third object type;
executing, in parallel with the first object detector, a fourth object detector that detects, in the ROI, a fourth situation object matching a fourth object type based on object features of the fourth situation object, the fourth situation object reflecting a fourth physical roadway object depicted in the ROI;
generating a fourth object confidence score for the fourth situation object based on a level of similarity between the fourth situation object and the fourth object type;
determining that the third object type detected by the third object detector and the fourth object type detected by the fourth object detector are associated with a second prospective situation category;
combining the third object confidence score and the fourth object confidence score into a second situation confidence score corresponding to the second prospective situation category; and
evaluating the first situation confidence score and the second situation confidence score to determine that the first prospective situation category applies to the ROI, the second prospective situation category applies to the ROI, and that the first traffic situation defined by the first prospective situation category and a second traffic situation defined by the second prospective situation category are depicted in the ROI.

6. The method of claim 1, further comprising:
executing, in parallel with the first object detector, a third object detector that detects, in the ROI, a third situation object matching a third object type based on object features of the third situation object, the third situation object reflecting a third physical roadway object depicted in the ROI;
generating a third object confidence score for the third situation object based on a level of similarity between the third situation object and the third object type;
executing, in parallel with the first object detector, a fourth object detector that detects, in the ROI, a fourth situation object matching a fourth object type based on object features of the fourth situation object, the fourth situation object reflecting a fourth physical roadway object depicted in the ROI;
generating a fourth object confidence score for the fourth situation object based on a level of similarity between the fourth situation object and the fourth object type;
determining that the third object type detected by the third object detector and the fourth object type detected by the fourth object detector are associated with a second prospective situation category;
combining the third object confidence score and the fourth object confidence score into a second situation confidence score corresponding to the second prospective situation category; and
evaluating the first situation confidence score and the second situation confidence score to determine that the first prospective situation category applies to the ROI, the second prospective situation category does not apply to the ROI, and that the first traffic situation defined by the first prospective situation category is depicted in the ROI.

7. The method of claim 1, further comprising:
executing, in parallel with the first object detector, a third object detector that detects, in the ROI, a third situation object matching a third object type based on object features of the third situation object, the third situation object reflecting a third physical roadway object depicted in the ROI;
generating a third object confidence score for the third situation object based on a level of similarity between the third situation object and the third object type;
determining that the first object type detected by the first object detector and the third object type detected by the third object detector are associated with a second prospective situation category;
combining the first object confidence score and the third object confidence score into a second situation confidence score corresponding to the second prospective situation category; and
evaluating the first situation confidence score and the second situation confidence score to determine that the first prospective situation category applies to the ROI, the second prospective situation category does not apply to the ROI, and that the first traffic situation defined by the first prospective situation category is depicted in the ROI.

8. The method of claim 1, wherein combining the first object confidence score and the second object confidence score into the first situation confidence score corresponding to the first prospective situation category includes:
retrieving a first situation detection weight of the first object type in detecting traffic situations defined by the first prospective situation category;
retrieving a second situation detection weight of the second object type in detecting the traffic situations defined by the first prospective situation category; and
computing the first situation confidence score based on the first object confidence score of the first situation object, the first situation detection weight of the first object type, the second object confidence score of the second situation object, and the second situation detection weight of the second object type.

9. The method of claim 8, further comprising:
determining that a second traffic situation defined by the first prospective situation category is depicted in a training image; and
adjusting one or more of the first situation detection weight of the first object type in detecting the traffic situations defined by the first prospective situation category and the second situation detection weight of the second object type in detecting the traffic situations defined by the first prospective situation category based on a comparison of the second traffic situation detected in the training image to a predetermined target output associated with the training image.

10. A system comprising:
one or more processors;
one or more memories storing instructions that, when executed by the one or more processors, cause the system to:
extract a region of interest (ROI) from an image depicting a roadway;
execute a first object detector that detects, in the ROI, a first situation object matching a first object type based on object features of the first situation object, the first situation object reflecting a first physical roadway object depicted in the ROI;
generate a first object confidence score for the first situation object based on a level of similarity between the first situation object and the first object type;
execute, in parallel with the first object detector, a second object detector that detects, in the ROI, a second situation object matching a second object type that is different from the first object type based on object features of the second situation object, the second situation object reflecting a second physical roadway object depicted in the ROI;
generate a second object confidence score for the second situation object based on a level of similarity between the second situation object and the second object type;
determine that the first object type detected by the first object detector and the second object type detected by the second object detector are associated with a first prospective situation category;
combine the first object confidence score and the second object confidence score into a first situation confidence score corresponding to the first prospective situation category; and
evaluate the first situation confidence score to determine that the first prospective situation category applies to the ROI and that a first traffic situation defined by the first prospective situation category is depicted in the ROI.

11. The system of claim 10, wherein the instructions, when executed by the one or more processors, further cause the system to:
determine a first bounding box indicating the first situation object in the ROI;
determine a second bounding box indicating the second situation object in the ROI; and
aggregate the first bounding box indicating the first situation object and the second bounding box indicating the second situation object to generate a situation region of the first traffic situation depicted in the ROI.

12. The system of claim 10, wherein to extract the ROI from the image includes:
extracting, from the image, the ROI associated with a prominent color.

13. The system of claim 10, wherein:
the first prospective situation category is associated with a first set of object types in a data store, the first set of object types including the first object type detected by the first object detector and the second object type detected by the second object detector; and
a second prospective situation category is associated with a second set of object types in the data store, the second set of object types including a third object type detected by a third object detector and a fourth object type detected by a fourth object detector, the third object type being different from the fourth object type.

14. The system of claim 10, wherein the instructions, when executed by the one or more processors, further cause the system to:
execute, in parallel with the first object detector, a third object detector that detects, in the ROI, a third situation object matching a third object type based on object features of the third situation object, the third situation object reflecting a third physical roadway object depicted in the ROI;
generate a third object confidence score for the third situation object based on a level of similarity between the third situation object and the third object type;
execute, in parallel with the first object detector, a fourth object detector that detects, in the ROI, a fourth situation object matching a fourth object type based on object features of the fourth situation object, the fourth situation object reflecting a fourth physical roadway object depicted in the ROI;
generate a fourth object confidence score for the fourth situation object based on a level of similarity between the fourth situation object and the fourth object type;
determine that the third object type detected by the third object detector and the fourth object type detected by the fourth object detector are associated with a second prospective situation category;
combine the third object confidence score and the fourth object confidence score into a second situation confidence score corresponding to the second prospective situation category; and
evaluate the first situation confidence score and the second situation confidence score to determine that the first prospective situation category applies to the ROI, the second prospective situation category applies to the ROI, and that the first traffic situation defined by the first prospective situation category and a second traffic situation defined by the second prospective situation category are depicted in the ROI.

15. The system of claim 10, wherein the instructions, when executed by the one or more processors, further cause the system to:
  execute, in parallel with the first object detector, a third object detector that detects, in the ROI, a third situation object matching a third object type based on object features of the third situation object, the third situation object reflecting a third physical roadway object depicted in the ROI;
  generate a third object confidence score for the third situation object based on a level of similarity between the third situation object and the third object type;
  execute, in parallel with the first object detector, a fourth object detector that detects, in the ROI, a fourth situation object matching a fourth object type based on object features of the fourth situation object, the fourth situation object reflecting a fourth physical roadway object depicted in the ROI;
  generate a fourth object confidence score for the fourth situation object based on a level of similarity between the fourth situation object and the fourth object type;
  determine that the third object type detected by the third object detector and the fourth object type detected by the fourth object detector are associated with a second prospective situation category;
  combine the third object confidence score and the fourth object confidence score into a second situation confidence score corresponding to the second prospective situation category; and
  evaluate the first situation confidence score and the second situation confidence score to determine that the first prospective situation category applies to the ROI, the second prospective situation category does not apply to the ROI, and that the first traffic situation defined by the first prospective situation category is depicted in the ROI.

16. The system of claim 10, wherein the instructions, when executed by the one or more processors, further cause the system to:
  execute, in parallel with the first object detector, a third object detector that detects, in the ROI, a third situation object matching a third object type based on object features of the third situation object, the third situation object reflecting a third physical roadway object depicted in the ROI;
  generate a third object confidence score for the third situation object based on a level of similarity between the third situation object and the third object type;
  determine that the first object type detected by the first object detector and the third object type detected by the third object detector are associated with a second prospective situation category;
  combine the first object confidence score and the third object confidence score into a second situation confidence score corresponding to the second prospective situation category; and
  evaluate the first situation confidence score and the second situation confidence score to determine that the first prospective situation category applies to the ROI, the second prospective situation category does not apply to the ROI, and that the first traffic situation defined by the first prospective situation category is depicted in the ROI.

17. The system of claim 10, wherein to combine the first object confidence score and the second object confidence score into the first situation confidence score corresponding to the first prospective situation category includes:
  retrieving a first situation detection weight of the first object type in detecting traffic situations defined by the first prospective situation category;
  retrieving a second situation detection weight of the second object type in detecting the traffic situations defined by the first prospective situation category; and
  computing the first situation confidence score based on the first object confidence score of the first situation object, the first situation detection weight of the first object type, the second object confidence score of the second situation object, and the second situation detection weight of the second object type.

18. The system of claim 17, wherein the instructions, when executed by the one or more processors, further cause the system to:
  determine that a second traffic situation defined by the first prospective situation category is depicted in a training image; and
  adjust one or more of the first situation detection weight of the first object type in detecting the traffic situations defined by the first prospective situation category and the second situation detection weight of the second object type in detecting the traffic situations defined by the first prospective situation category based on a comparison of the second traffic situation detected in the training image to a predetermined target output associated with the training image.

19. A method comprising:
  extracting a first region of interest (ROI) from a first image depicting a roadway;
  executing, in parallel, a first object detector that detects a first situation object matching a first object type in the first ROI and a second object detector that detects a second situation object matching a second object type in the first ROI, the first object type being different from the second object type;
  generating a first object confidence score for the first situation object and a second object confidence score for the second situation object;
  determining that the first object type detected by the first object detector and the second object type detected by the second object detector are associated with a first prospective situation category;
  combining the first object confidence score and the second object confidence score into a first situation confidence score corresponding to the first prospective situation category;
  evaluating the first situation confidence score to determine that the first prospective situation category does not apply to the first ROI of the first image and that a first traffic situation defined by the first prospective situation category is not depicted in the first ROI of the first image;
  extracting a second ROI from a second image depicting the roadway;
  executing, in parallel, the first object detector that detects a third situation object matching the first object type in the second ROI and the second object detector that detects a fourth situation object matching the second object type in the second ROI;
  generating a third object confidence score for the third situation object and a fourth object confidence score for the fourth situation object;

combining the third object confidence score and the fourth object confidence score into a second situation confidence score corresponding to the first prospective situation category; and evaluating the second situation confidence score to determine that the first prospective situation category applies to the second ROI of the second image and that the first traffic situation defined by the first prospective situation category is depicted in the second ROI of the second image.

* * * * *